United States Patent
Kitsukawa et al.

(10) Patent No.: US 12,276,720 B2
(45) Date of Patent: Apr. 15, 2025

(54) RADAR DEVICE, OBSERVATION TARGET DETECTING METHOD, AND IN-VEHICLE DEVICE

(71) Applicant: MITSUBISHI ELECTRIC CORPORATION, Tokyo (JP)

(72) Inventors: Yusuke Kitsukawa, Tokyo (JP); Noriyuki Fukui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 377 days.

(21) Appl. No.: 17/840,992

(22) Filed: Jun. 15, 2022

(65) Prior Publication Data

US 2022/0308197 A1 Sep. 29, 2022

Related U.S. Application Data

(63) Continuation of application No. PCT/JP2020/006957, filed on Feb. 21, 2020.

(51) Int. Cl.
*G01S 13/58* (2006.01)
*G01S 7/35* (2006.01)
(Continued)

(52) U.S. Cl.
CPC .......... *G01S 13/584* (2013.01); *G01S 13/34* (2013.01); *G01S 13/87* (2013.01); *G01S 7/356* (2021.05)

(58) Field of Classification Search
CPC .......... G01S 13/583–584; G01S 7/356; G01S 13/87; G01S 13/34; G01S 13/931
See application file for complete search history.

(56) References Cited

U.S. PATENT DOCUMENTS 10,401,486 B2 9/2019 Schoor
2011/0309968 A1* 12/2011 Reiher ............... G01S 13/584
342/112

(Continued)

FOREIGN PATENT DOCUMENTS

JP 2010-203918 A 9/2010
JP 2017-522577 A 8/2017
(Continued)

OTHER PUBLICATIONS

International Search Report (PCT/ISA/210) issued in PCT/JP2020/006957 mailed on Apr. 14, 2020.
(Continued)

*Primary Examiner* — Matthew M Barker
(74) *Attorney, Agent, or Firm* — Birch, Stewart, Kolasch & Birch, LLP

(57) ABSTRACT

A radar device includes: a first radar and a second radar to transmit, as radar signals, frequency modulated signals whose frequency gradients with a lapse of time are different from each other and receive reflected waves of the radar signals; a calculation unit to calculate a first frequency spectrum obtained by performing Fourier transform in a distance direction on digital data of a beat signal and a second frequency spectrum obtained by performing Fourier transform in a relative velocity direction on the first frequency spectrum, and calculate distance and velocity information for each radar on the basis of a beat frequency and a Doppler frequency corresponding to a peak value in the second frequency spectrum; and a processing unit to compare the distance and velocity information calculated for each of the radars.

13 Claims, 12 Drawing Sheets

(51) Int. Cl.
  *G01S 13/34*  (2006.01)
  *G01S 13/87*  (2006.01)

(56) References Cited

U.S. PATENT DOCUMENTS

| | | |
|---|---|---|
| 2016/0061935 A1 | 3/2016 | McCloskey et al. |
| 2017/0131397 A1 | 5/2017 | Schoor |
| 2017/0293016 A1 | 10/2017 | McCloskey et al. |
| 2020/0326407 A1 | 10/2020 | McCloskey et al. |
| 2021/0018588 A1 | 1/2021 | Akamine et al. |
| 2022/0128649 A1 | 4/2022 | McCloskey et al. |

FOREIGN PATENT DOCUMENTS

| | | |
|---|---|---|
| JP | 2017-529525 A | 10/2017 |
| JP | 6416391 B2 | 10/2018 |
| JP | 2019-158797 A | 9/2019 |
| JP | 2019-184370 A | 10/2019 |

OTHER PUBLICATIONS

Japanese Office Action for application No. 2020-535261 dated Aug. 18, 2020.

Written Opinion (PCT/ISA/237) issued in PCT/JP2020/006957 mailed on Apr. 14, 2020.

\* cited by examiner

RADAR DEVICE, OBSERVATION TARGET DETECTING METHOD, AND IN-VEHICLE DEVICE

CROSS REFERENCE TO RELATED APPLICATIONS

This application is a Continuation of PCT International Application No. PCT/JP2020/006957, filed on Feb. 21, 2020, which is hereby expressly incorporated by reference into the present application.

TECHNICAL FIELD

The present disclosure relates to a radar device, an observation target detecting method, and an in-vehicle device.

BACKGROUND ART

A frequency modulated continuous wave (FMCW) radar device is conventionally known. For example, a radar device described in Patent Literature 1 is mounted on an automobile, distributes a frequency modulated signal into a transmission signal and a local oscillation signal, transmits the transmission signal as a radar signal, and receives a reflected wave of the radar signal reflected by an observation target. The radar device measures a distance to the observation target by using a spectrum of a baseband signal obtained by mixing a frequency of the reflected wave and a frequency of the local oscillation signal.

When measuring the distance to the observation target, the conventional FMCW radar device performs, on the baseband signal, filtering that minimizes a Doppler frequency with respect to a vehicle velocity. As a result, a reflected wave from clutter (a stationary object other than a target) corresponding to the same frequency as the Doppler frequency with respect to the vehicle velocity is suppressed as noise.

CITATION LIST

Patent Literature

Patent Literature 1: JP 2017-522577 A

SUMMARY OF INVENTION

Technical Problem

In the radar device described in Patent Literature 1, since electromagnetic noise having a frequency different from the Doppler frequency with respect to the vehicle velocity is not considered, there has been a problem that a result of erroneous detection due to the electromagnetic noise and a result of detection of the observation target cannot be discriminated from each other. The electromagnetic noise includes, for example, electromagnetic noise generated in components constituting the radar device and electromagnetic noise coming from the outside of the radar device.

The present disclosure has been made to solve the problem described above, and it is an object to obtain a radar device, an observation target detecting method, and an in-vehicle device, each of which can discriminate between a result of detection of an observation target and a result of erroneous detection due to electromagnetic noise.

Solution to Problem

A radar device according to the present disclosure includes: a plurality of radars each to transmit, as a radar signal, a frequency modulated signal whose frequency linearly changes with a lapse of time, and receive a reflected wave of the radar signal reflected by an observation target; and processing circuitry to calculate distance and velocity information indicating a distance to the observation target and a relative velocity with respect to the observation target, by using digital data of a beat signal having a frequency of a difference between a frequency of the radar signal and a frequency of the reflected wave, and to detect the observation target on a basis of the distance and velocity information, wherein the radars transmit, as radar signals, frequency modulated signals whose frequency gradients with a lapse of time are different from each other, each ratio of absolute values of the frequency gradients being other than 1, and the processing circuitry calculates a first frequency spectrum obtained by performing Fourier transform in a distance direction on the digital data of the beat signal and a second frequency spectrum obtained by performing Fourier transform in a relative velocity direction on the first frequency spectrum, and calculates, for each of the radars, the distance and velocity information on a basis of a beat frequency and a Doppler frequency corresponding to a peak value in the second frequency spectrum, and the processing circuitry compares the distance and velocity information calculated for each of the radars, when the distance and velocity included in the distance and velocity information match between the radars, the processing circuitry determines that the distance and velocity included in the distance and velocity information are the distance to the observation target and the relative velocity with respect to the observation target, and when the distance and velocity included in the distance and velocity information do not match between the radars due to their differences corresponding to differences in frequency gradients of radar signals, the processing circuitry determines that the distance and velocity included in the distance and velocity information result from erroneous detection due to electromagnetic noise.

Advantageous Effects of Invention

According to the present disclosure, the frequency modulated signals whose frequency gradients are different from each other are transmitted as the radar signals by the radars, each ratio of absolute values of the frequency gradients being other than 1, and reflected waves of the radar signals reflected by the observation target are received. By using the digital data of the beat signal having the frequency of the difference between the frequency of the radar signal and the frequency of the reflected wave, the distance and velocity information indicating the distance to the observation target and the relative velocity with respect to the observation target is calculated for each radar. The result of detection of the observation target and the result of erroneous detection due to the electromagnetic noise which are included in the distance and velocity information are discriminated from each other on the basis of the result of comparison of the distance and velocity information for each radar. As a result, the radar device according to the present disclosure can discriminate between the result of detection of the observation target and the result of erroneous detection due to the electromagnetic noise.

DESCRIPTION OF EMBODIMENTS

First Embodiment

Figure 1:
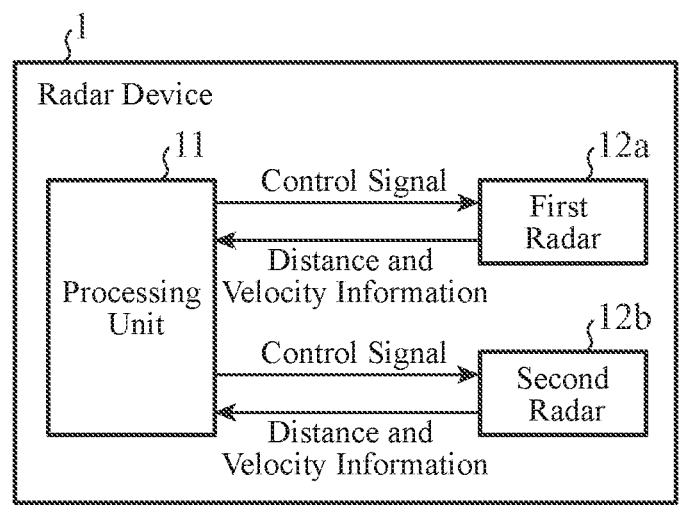
FIG. 1 is a block diagram illustrating a configuration of a radar device according to a first embodiment.

FIG. 1 is a block diagram illustrating a configuration of a radar device 1 according to a first embodiment. The radar device 1 is mounted on, for example, an automobile and observes an automobile, a passerby, or a guardrail present around the automobile. In FIG. 1, the radar device 1 includes a processing unit 11, a first radar 12a, and a second radar 12b. Note that although FIG. 1 illustrates a radar device including two radars, this is an example. The radar device 1 may include three or more radars. In addition, the first radar 12a and the second radar 12b may be arranged close to each other or may be arranged apart from each other as long as the same observation target can be detected.

The first radar 12a and the second radar 12b each transmits a frequency modulated signal whose frequency linearly changes with a lapse of time as a radar signal, and receive a reflected wave of the radar signal reflected by an observation target. The processing unit 11 outputs, to the first radar 12a and the second radar 12b, a control signal that specifies parameters that determine a transmission cycle of the radar signal and a transmission waveform of the radar signal. In accordance with the control signal from the processing unit 11, the first radar 12a and the second radar 12b transmit radar signals of transmission waveforms whose frequency gradients with a lapse of time are different from each other into space.

The first radar 12a and the second radar 12b each calculate distance and velocity information indicating a distance to the observation target and a relative velocity with respect to the observation target, by using digital data of a beat signal having a frequency of a difference between a frequency of the transmitted radar signal and a frequency of the received reflected wave. The processing unit 11 detects the observation target on the basis of the distance and velocity information calculated by the first radar 12a and the second radar 12b.

Figure 2:
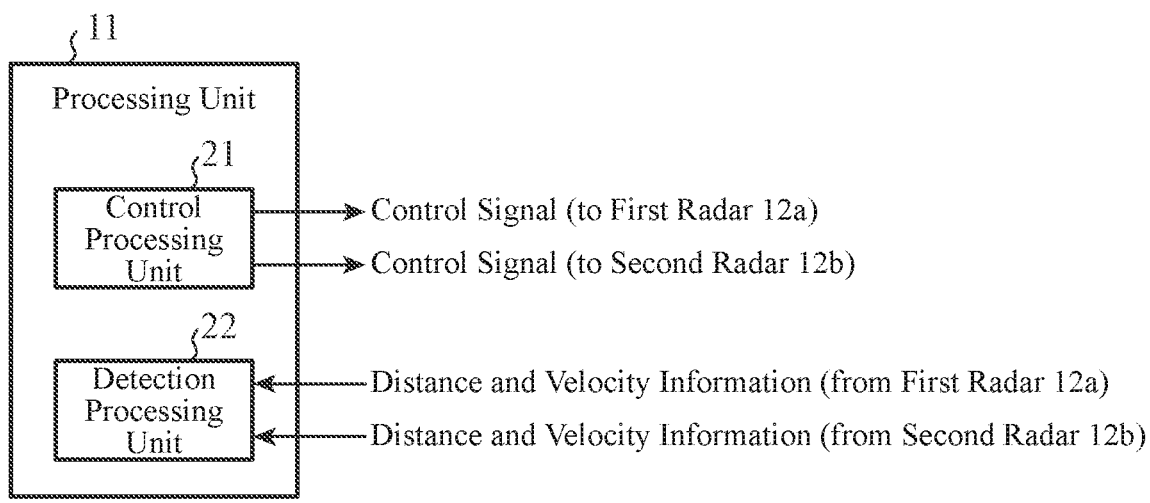
FIG. 2 is a block diagram illustrating a configuration of a processing unit in FIG. 1.

FIG. 2 is a block diagram illustrating a configuration of the processing unit 11. In FIG. 2, the processing unit 11 includes a control processing unit 21 and a detection processing unit 22. The control processing unit 21 outputs a control signal corresponding to each radar to the first radar 12a and the second radar 12b. The detection processing unit 22 discriminates between a result of detection of the observation target and a result of erroneous detection due to electromagnetic noise which are included in the distance and velocity information, on the basis of a result of comparison between distance and velocity information output from the first radar 12a and distance and velocity information output from the second radar 12b. The electromagnetic noise has a frequency different from a Doppler frequency with respect to the velocity of a vehicle on which the radar device 1 is mounted, and is noise that cannot be suppressed as clutter.

Figure 3:
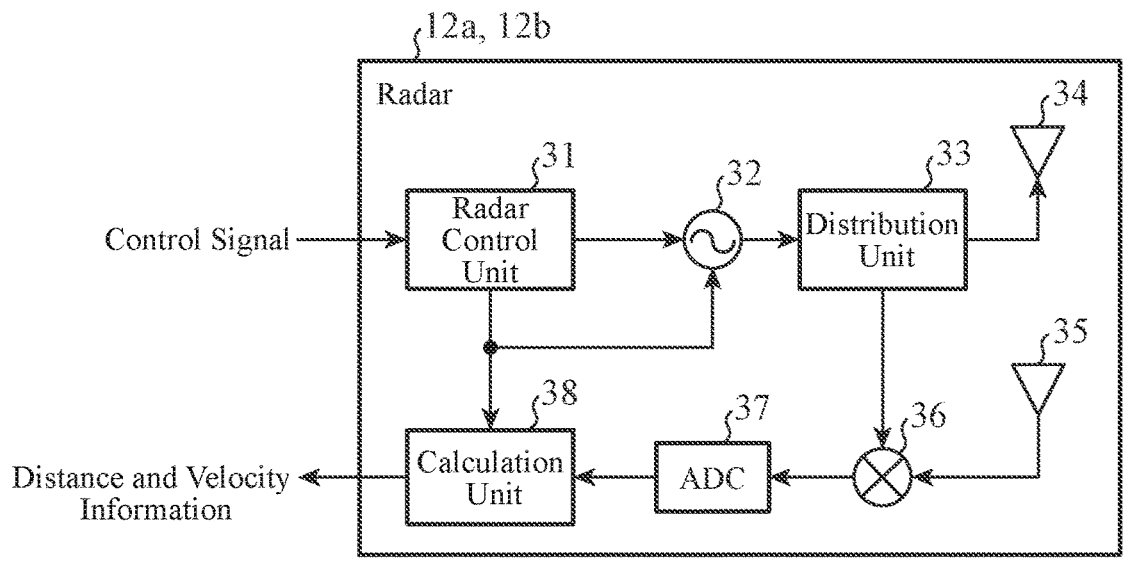
FIG. 3 is a block diagram illustrating each configuration of a first radar and a second radar in the first embodiment.

FIG. 3 is a block diagram illustrating each configuration of the first radar 12a and the second radar 12b. As illustrated in FIG. 3, each of the first radar 12a and the second radar 12b includes a radar control unit 31, a signal source 32, a distribution unit 33, a transmission antenna 34, a reception antenna 35, a frequency mixing unit 36, an analog-to-digital converter (hereinafter, referred to as ADC) 37, and a calculation unit 38.

The radar control unit 31 outputs, to the signal source 32, the parameters that determine the transmission cycle of the radar signal and the transmission waveform of the radar signal specified by the control signal from the control processing unit 21, and outputs the transmission cycle of the radar signal to the calculation unit 38. The signal source 32 intermittently and repeatedly outputs a frequency modulated signal whose frequency changes with a lapse of time to the distribution unit 33 as the radar signal in accordance with the transmission cycle input from the radar control unit 31. The distribution unit 33 distributes the radar signal output from the signal source 32 to the transmission antenna 34 and the frequency mixing unit 36.

The transmission antenna 34 is an antenna to radiate an electromagnetic wave of the radar signal output from the distribution unit 33 into space. The reception antenna 35 is an antenna to receive a reflected wave of the radar signal reflected by the observation target. A reception signal of the reflected wave received by the reception antenna 35 is output to the frequency mixing unit 36. The frequency mixing unit 36 is a beat signal generation unit to generate a beat signal having a frequency of a difference between the frequency of the radar signal and the frequency of the reflected wave, by frequency mixing of a frequency of a local oscillation signal that is the radar signal output from the distribution unit 33, and the frequency of the reflected wave received by the reception antenna 35.

The ADC 37 is a conversion unit to convert the beat signal generated by the frequency mixing unit 36 from analog data to digital data. Since the radar signal is intermittently and repeatedly output from the signal source 32 every transmission cycle designated by the radar control unit 31, the frequency mixing unit 36 generates a beat signal every transmission cycle. As a result, the ADC 37 converts a plurality of beat signals for each transmission cycles into digital data, and sequentially outputs a plurality of converted digital data to the calculation unit 38.

The calculation unit 38 calculates a first frequency spectrum by performing Fourier transform in the distance direction on the digital data of the beat signal output from the ADC 37, and calculates a second frequency spectrum by performing Fourier transform in the relative velocity direction on the first frequency spectrum. Furthermore, the calculation unit 38 calculates the distance and velocity information for each radar on the basis of a beat frequency and a Doppler frequency corresponding to a peak value in the second frequency spectrum. The distance and velocity information calculated by the calculation unit 38 is output to the detection processing unit 22.

In FIG. 3, description is omitted of components of a general radar, such as an amplifier and a filter. For example, an amplifier may be disposed on the input side of the transmission antenna 34 or the output side of the reception antenna 35, or a filter may be disposed on the input side of the transmission antenna 34 or the output side of the frequency mixing unit 36. Note that each of the first radar 12a and the second radar 12b illustrated in FIG. 3 includes one each of the transmission antenna 34 and the reception antenna 35, but may be a radar including two or more each of the transmission antennas 34 and the reception antennas 35.

Figure 4:
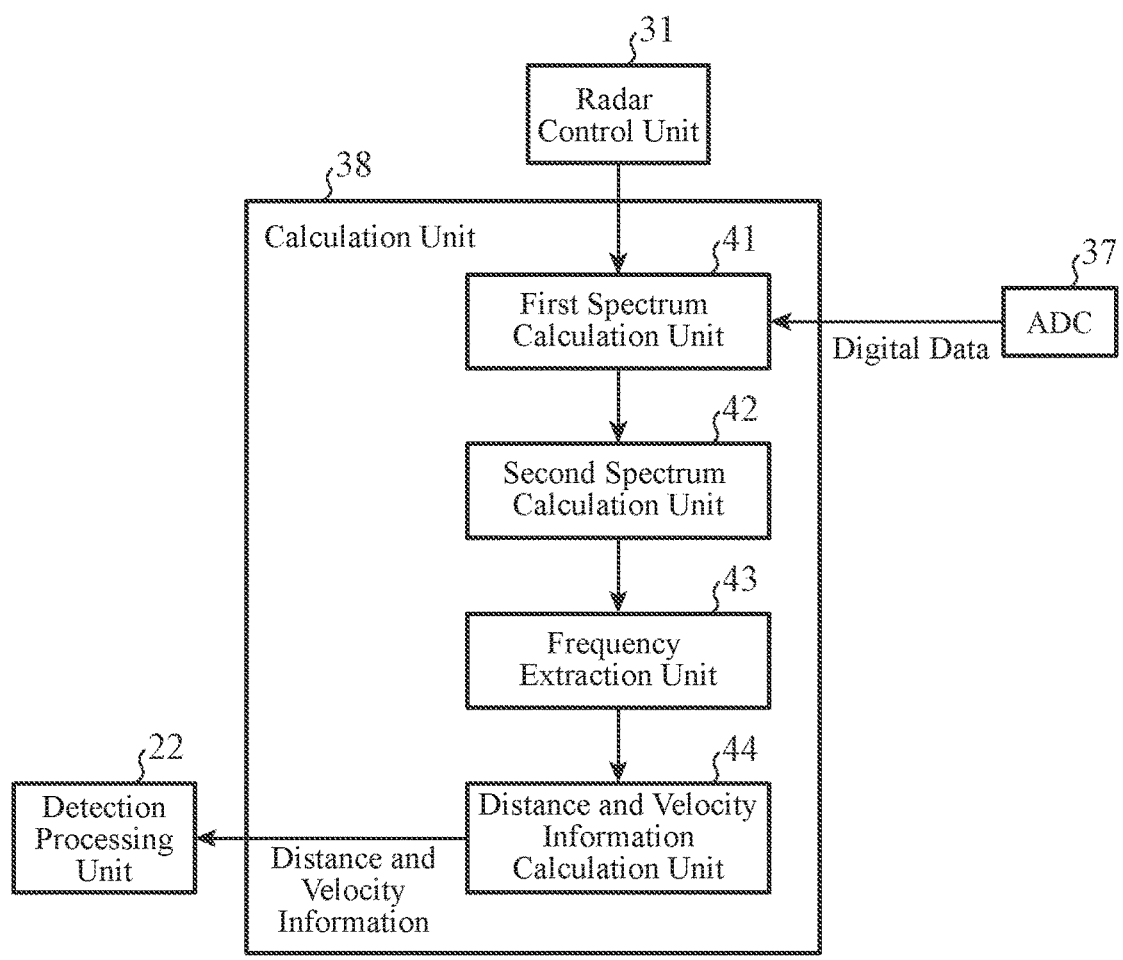
FIG. 4 is a block diagram illustrating a configuration of a calculation unit in FIG. 3.

FIG. 4 is a block diagram illustrating a configuration of the calculation unit 38. In FIG. 4, the calculation unit 38 includes a first spectrum calculation unit 41, a second spectrum calculation unit 42, a frequency extraction unit 43, and a distance and velocity information calculation unit 44. The first spectrum calculation unit 41 calculates a plurality of first frequency spectra by performing Fourier transform in the distance direction on the digital data for each transmission cycles designated by the radar control unit 31 among the digital data intermittently and repeatedly output from the ADC 37. The second spectrum calculation unit 42 calculates the second frequency spectrum by performing Fourier transform in the relative velocity direction on the plurality of first frequency spectra calculated by the first spectrum calculation unit 41.

The frequency extraction unit 43 extracts the beat frequency and the Doppler frequency corresponding to the peak value in the second frequency spectrum. The distance and velocity information calculation unit 44 calculates the distance to the observation target on the basis of the beat frequency output from the frequency extraction unit 43, calculates the relative velocity with respect to the observation target on the basis of the Doppler frequency output from the frequency extraction unit 43, and calculates distance and velocity information indicating the calculated distance and relative velocity. The distance and velocity information calculated by the distance and velocity information calculation unit 44 is output to the detection processing unit 22.

Figure 5:
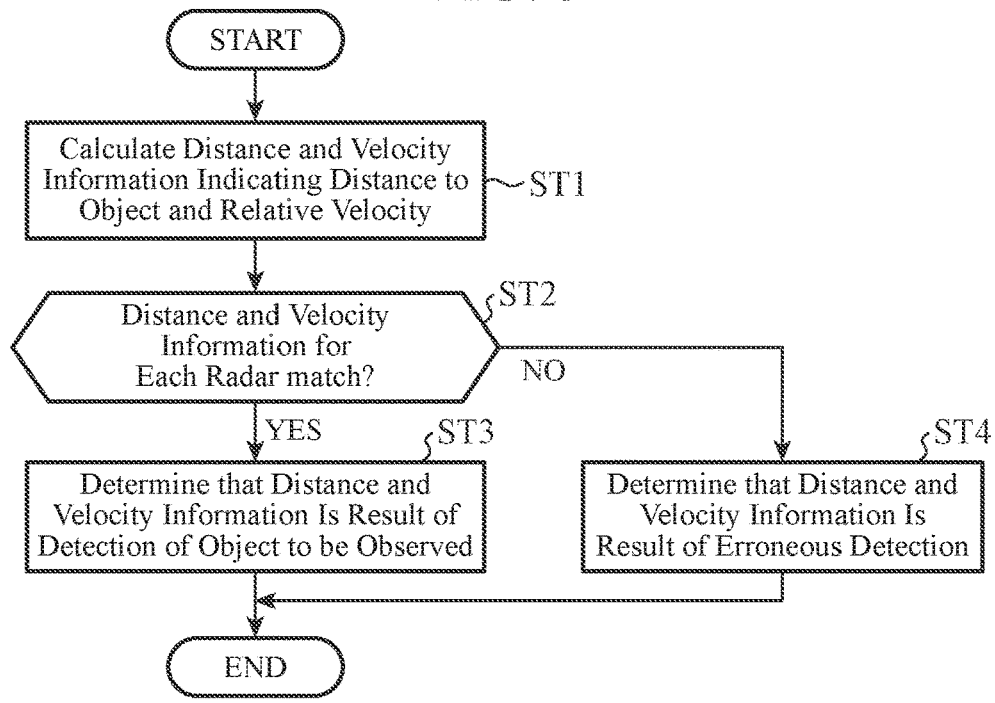
FIG. 5 is a flowchart illustrating an observation target detecting method according to the first embodiment.

FIG. 5 is a flowchart illustrating an observation target detecting method according to the first embodiment.

The first radar 12a and the second radar 12b transmit frequency modulated signals whose frequency gradients with a lapse of time are different from each other as radar signals for each transmission cycle, and receive reflected waves of the radar signals reflected by the observation target.

Each calculation unit 38 included in the first radar 12a and the second radar 12b calculates distance and velocity information (step ST1). For example, the calculation unit 38 included in the first radar 12a acquires digital data of a beat signal having a frequency of a difference between a frequency of the radar signal and a frequency of the reflected wave of the radar signal, and calculates a plurality of first frequency spectra for each transmission cycles by performing Fourier transform in the distance direction on the acquired digital data. The calculation unit 38 calculates a second frequency spectrum by performing Fourier transform in the relative velocity direction on the plurality of first frequency spectra. Then, the calculation unit 38 calculates the distance and velocity information regarding the observation target on the basis of a beat frequency and a Doppler frequency corresponding to a peak value in the second frequency spectrum. In the second radar 12b, distance and velocity information regarding the same observation target is calculated by a similar procedure.

Next, the processing unit 11 compares the distance and velocity information output from the first radar 12a with the distance and velocity information output from the second radar 12b, and determines whether or not the distances and the relative velocities indicated by these match (step ST2). In a case where it is determined that the distances and the relative velocities indicated by these match (step ST2; YES), the processing unit 11 determines that the distance and the relative velocity indicated by the distance and velocity information are results of detection of the distance to the observation target and the relative velocity with respect to the observation target (step ST3). In addition, in a case where it is determined that the distances and the relative velocities indicated by these do not match (step ST2; NO), the processing unit 11 determines that the distance and the relative velocity indicated by the distance and velocity information are result of erroneous detections due to electromagnetic noise (step ST4).

Figure 6:
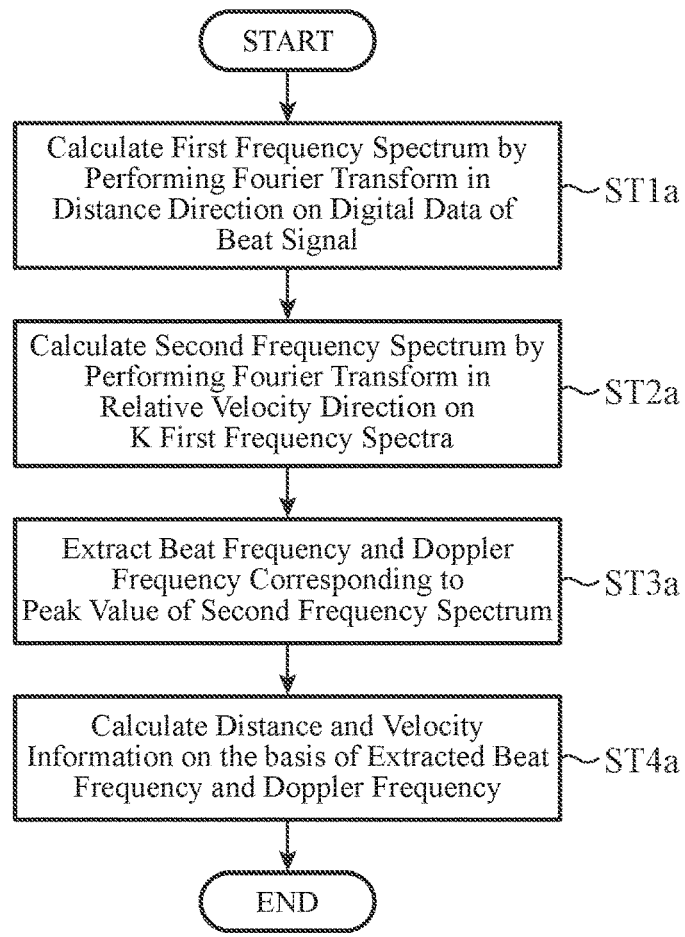
FIG. 6 is a flowchart illustrating detailed processing of step ST1 in FIG. 5.
Figure 7:
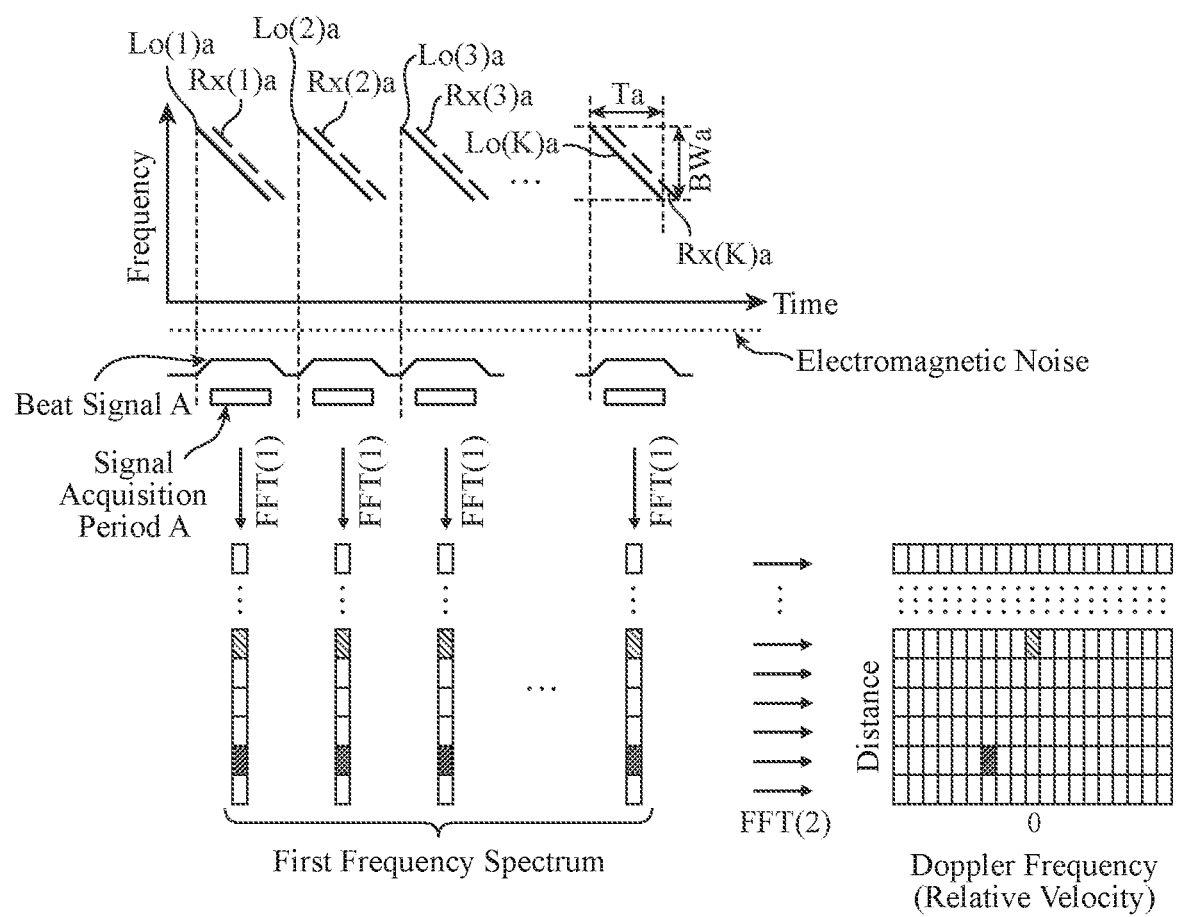
FIG. 7 is an explanatory diagram illustrating an outline of calculation processing of distance and velocity information by the calculation unit included in the first radar.
Figure 8:
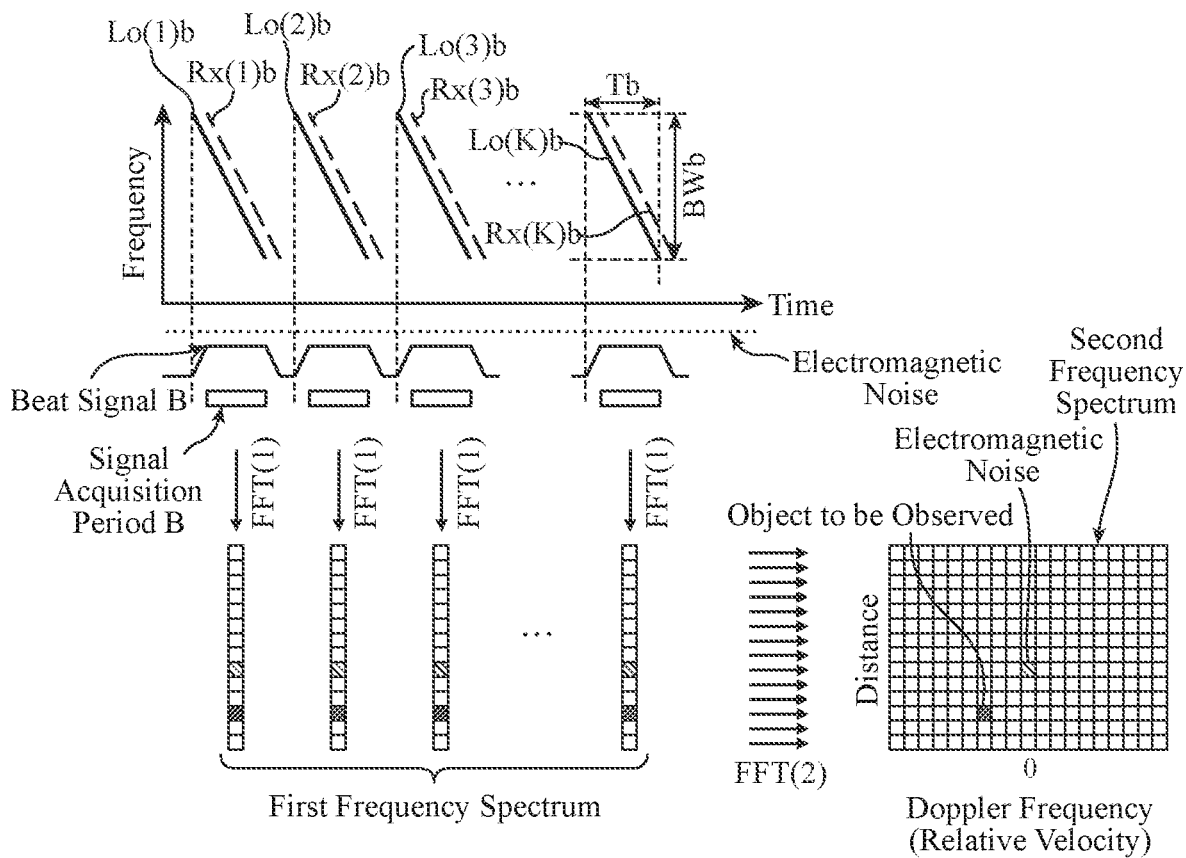
FIG. 8 is an explanatory diagram illustrating an outline of calculation processing of distance and velocity information by the calculation unit included in the second radar.
Figure 9:
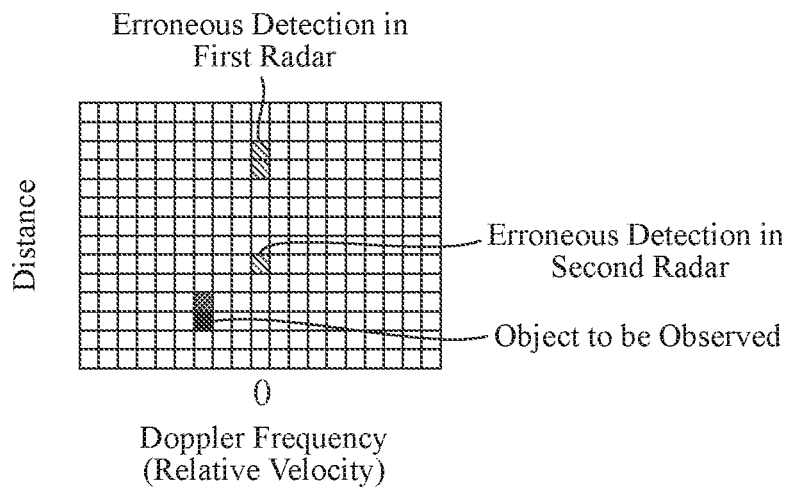
FIG. 9 is an explanatory diagram illustrating an outline of detection result determination processing in the first embodiment.

FIG. 6 is a flowchart illustrating detailed processing of step ST1 in FIG. 5. In addition, FIG. 7 is an explanatory diagram illustrating an outline of calculation processing of the distance and velocity information by the calculation unit 38 included in the first radar 12a. FIG. 8 is an explanatory diagram illustrating an outline of calculation processing of the distance and velocity information by the calculation unit 38 included in the second radar 12b. FIG. 9 is an explanatory diagram illustrating an outline of detection result determination processing in the first embodiment.

$Lo(1)a$, $Lo(2)a$, $Lo(3)a$, . . . , and $Lo(K)a$ are local oscillation signals (radar signals) output from the distribution unit 33 to the frequency mixing unit 36 in the first radar 12a. $Rx(1)a$, $Rx(2)a$, $Rx(3)a$, . . . , $Rx(K)a$ are reception signals of reflected waves of the radar signals reflected by the observation target, output from the reception antenna 35 to the frequency mixing unit 36, in the first radar 12a. Note that "K" is the number of times of output of the radar signal for one frame, and is an integer of greater than or equal to 2.

As indicated by a dotted line in FIG. 7, for example, electromagnetic noise of a continuous wave having a constant frequency is input to the ADC 37. A signal acquisition period A is a period in which the first spectrum calculation unit 41 acquires digital data of a beat signal A from the ADC 37. In addition, the signal acquisition period A is included in a transmission cycle in which the radar signal is output from the signal source 32. The length of the signal acquisition period A is substantially the same as one cycle of the local oscillation signal in the first radar 12a or less than that. "Ta" is a sweep time of the local oscillation signal Lo(k)a (k=1, 2, 3, ..., K), and is a time on the order of microseconds. "Bwa" is a frequency bandwidth of the local oscillation signal Lo(k)a.

In FIG. 7, for simplicity of description, a case is illustrated where the number of objects of observation of the radar device 1 is one. However, the number of objects of observation of the radar device 1 may be two or more. In addition, one electromagnetic noise that is a continuous wave having a constant frequency is indicated; however, a plurality of electromagnetic noises that is continuous waves having constant frequencies may be input to the ADC 37.

The first spectrum calculation unit 41 acquires the digital data output from the ADC 37 in the signal acquisition period A included in the transmission cycle of the radar signal designated by the radar control unit 31, and calculates the first frequency spectrum by performing Fourier transform in the distance direction on the digital data of the beat signal A acquired in the signal acquisition period A (step ST1a). In FIGS. 7 and 8, FFT(1) indicates fast Fourier transform (FFT) in the distance direction. By performing Fourier transform in the distance direction on the digital data of the beat signal A, a spectrum value of the reception signal Rx(k)a (k=1, 2, 3, ..., K) of the reflected wave is integrated at a beat frequency $F_{sb\_r\_a}$ expressed by the following equation (1). In the following equation (1), "R" is a distance from the radar device 1 to the observation target, and "c" is the speed of light. In the first frequency spectrum, the spectrum value corresponding to the observation target is integrated into the value of the corresponding beat frequency.

$$F_{sb\_r\_a} = \frac{2BW_a \cdot R}{c \cdot T_a} \qquad (1)$$

When Fourier transform is performed in the distance direction on the digital data of the beat signal A, a spectrum value corresponding to the electromagnetic noise is integrated at a frequency $F_{n\_r}$ of the electromagnetic noise in the first frequency spectrum. In FIG. 7, since the number of times of output of the radar signal from the signal source 32 is K, the first spectrum calculation unit 41 performs Fourier transform in the distance direction on digital data of K beat signals different from each other. As a result, K first frequency spectra are calculated. Data indicating the K first frequency spectra are output to the second spectrum calculation unit 42.

The second spectrum calculation unit 42 calculates the second frequency spectrum by performing Fourier transform in the relative velocity direction on the K first frequency spectra calculated by the first spectrum calculation unit 41 (step ST2a). In FIGS. 7 and 8, FFT(2) indicates FFT in the relative velocity direction. When Fourier transform is performed in the relative velocity direction on the K first frequency spectra, a spectrum value corresponding to the reception signal Rx(k)a of the reflected wave is integrated at a Doppler frequency $F_{sb\_v\_a}$ expressed by the following equation (2). In the following equation (2), "fa" is the center frequency of the local oscillation signal Lo(k)a, and "v" is the relative velocity between the radar device 1 and the observation target.

$$F_{sb\_v\_a} = \frac{2fa \cdot v}{c} \qquad (2)$$

In the second frequency spectrum, a spectrum value of the electromagnetic noise is integrated at a Doppler frequency $F_{n\_v}$ corresponding to a relative velocity between the radar device 1 and a generation source of the electromagnetic noise. For example, in FIG. 7, since the relative velocity between the radar device 1 and the generation source of the electromagnetic noise is 0, in the second frequency spectrum, the spectrum value corresponding to the electromagnetic noise is integrated at the Doppler frequency $F_{n\_v}$ corresponding to the relative velocity of 0. However, this is merely an example, and the spectrum value corresponding to the electromagnetic noise may be integrated at a Doppler frequency corresponding to a relative velocity other than 0 that is the relative velocity between the radar device 1 and the generation source of the electromagnetic noise. In the example illustrated in FIG. 7, the electromagnetic noise of the continuous wave is input to the ADC 37, and the frequency of the electromagnetic noise does not change. For this reason, the spectrum value corresponding to the electromagnetic noise is integrated at the frequency $F_{n\_r}$ of the electromagnetic noise.

Subsequently, the frequency extraction unit 43 detects a peak value from a plurality of spectrum values included in the second frequency spectrum, and extracts the beat frequency $F_{sb\_r\_a}$ and the Doppler frequency $F_{sb\_v\_a}$ corresponding to the peak value (step ST3a). For example, the frequency extraction unit 43 detects the peak value by using constant false alarm rate (CFAR) processing.

The beat frequency $F_{sb\_r\_a}$ corresponding to the peak value is a beat frequency corresponding to the distance from the radar device 1 to the observation target, and the Doppler frequency $F_{sb\_v\_a}$ corresponding to the peak value is a Doppler frequency corresponding to the relative velocity between the radar device 1 and the observation target. The beat frequency $F_{sb\_r\_a}$ and the Doppler frequency $F_{sb\_v\_a}$ extracted by the frequency extraction unit 43 are output to the distance and velocity information calculation unit 44.

In a situation where electromagnetic noise is generated, the frequency extraction unit 43 also detects the spectrum value corresponding to the electromagnetic noise as the peak value. In this case, the frequency $F_{n\_r}$ of the electromagnetic noise is erroneously detected as the beat frequency $F_{sb\_r\_a}$ and is output to the distance and velocity information calculation unit 44. Furthermore, the frequency extraction unit 43 also erroneously detects the Doppler frequency $F_{n\_v}$ corresponding to the relative velocity between the radar device 1 and the generation source of the electromagnetic noise as the Doppler frequency $F_{sb\_v\_a}$ corresponding to the relative velocity between the radar device 1 and the observation target, and outputs the Doppler frequency $F_{n\_v}$ to the distance and velocity information calculation unit 44.

Next, the distance and velocity information calculation unit 44 calculates distance and velocity information indicating the distance R from the radar device 1 to the observation target and the relative velocity v between the radar device 1 and the observation target, on the basis of the beat frequency $F_{sb\_r\_a}$ and the Doppler frequency $F_{sb\_v\_a}$ corresponding to the peak value extracted from the second frequency spectrum (step ST4a). For example, the distance and velocity information calculation unit 44 calculates the distance R from the radar device 1 to the observation target in accordance with the following equation (3) by using the beat frequency $F_{sb\_r\_a}$ corresponding to the peak value.

$$R = \frac{c \cdot T_a}{2BW_a} F_{sb\_r\_a} \quad (3)$$

Furthermore, the distance and velocity information calculation unit 44 calculates the relative velocity v between the radar device 1 and the observation target in accordance with the following equation (4) by using the Doppler frequency $F_{sb\_v\_a}$ corresponding to the peak value extracted from the second frequency spectrum. The distance and velocity information calculation unit 44 generates the distance and velocity information indicating the distance R and the relative velocity v, and outputs the distance and velocity information to the detection processing unit 22 as distance and velocity information corresponding to the observation target detected by the first radar 12a.

$$v = \frac{c}{2fa} F_{sb\_v\_a} \quad (4)$$

The frequency $F_{n\_r}$ of the electromagnetic noise is input to the distance and velocity information calculation unit 44 as the beat frequency $F_{sb\_r\_a}$. For this reason, the distance and velocity information output from the distance and velocity information calculation unit 44 to the detection processing unit 22 also includes a distance $R_{n\_a}$ that is a result of erroneous detection of the distance R due to the electromagnetic noise. The distance $R_{n\_a}$ is calculated by using the following equation (5).

$$R_{n\_a} = \frac{c \cdot T_a}{2BW_a} F_{n\_r} \quad (5)$$

Furthermore, the Doppler frequency $F_{n\_v}$ corresponding to the relative velocity between the radar device 1 and the generation source of the electromagnetic noise is input to the distance and velocity information calculation unit 44 as the Doppler frequency $F_{sb\_v\_a}$. For this reason, the distance and velocity information output from the distance and velocity information calculation unit 44 to the detection processing unit 22 also includes a relative velocity $v_{n\_a}$ that is a result of erroneous detection of the relative velocity v due to the electromagnetic noise. The relative velocity $v_{n\_a}$ is calculated by using the following equation (6).

$$v_{n\_a} = \frac{c}{2fa} F_{n\_v} \quad (6)$$

Lo(1)b, Lo(2)b, Lo(3)b, . . . , and Lo(k)b are local oscillation signals (radar signals) output from the distribution unit 33 to the frequency mixing unit 36 in the second radar 12b. Rx(1)b, Rx(2)b, Rx(3)b, . . . , Rx(K)b are reception signals of reflected waves output from the reception antenna 35 to the frequency mixing unit 36 in the second radar 12b. "K" is the number of times of output of the radar signal for one frame, and is an integer of greater than or equal to 2.

As indicated by a dotted line in FIG. 8, for example, electromagnetic noise of a continuous wave having a constant frequency is input to the ADC 37. A signal acquisition period B is a period in which the first spectrum calculation unit 41 acquires digital data of a beat signal B from the ADC 37. In addition, the signal acquisition period B is included in a transmission cycle in which the radar signal is output from the signal source 32. The length of the signal acquisition period B is substantially the same as one cycle of the local oscillation signal in the second radar 12b or less than that.

In addition, "Tb" is a sweep time of the local oscillation signal Lo(k)b (k=1, 2, 3, . . . , K), and is a time on the order of microseconds. "BWb" is a frequency bandwidth of the local oscillation signal Lo(k)b. To implement different gradients from each other in the frequency modulated signals transmitted by the first radar 12a and the second radar 12b, the sweep time Ta and the sweep time Tb are set to be equal to each other, and the frequency bandwidth BWb of the frequency modulated signal transmitted by the second radar 12b is set to be twice the frequency bandwidth BWa of the frequency modulated signal transmitted by the first radar 12a. However, this is merely an example, and the frequency bandwidth does not have to be doubled. In addition, by varying the sweep times of the frequencies of the radar signals transmitted by the first radar 12a and the second radar 12b, transmission waveforms can be implemented of frequency modulated signals having different gradients from each other.

In the second radar 12b, the distance and velocity information calculation unit 44 calculates distance and velocity information indicating the distance R from the radar device 1 to the observation target and the relative velocity v between the radar device 1 and the observation target, on the basis of a beat frequency $F_{sb\_r\_b}$ and a Doppler frequency $F_{sb\_v\_b}$ corresponding to the peak value extracted by the frequency extraction unit 43. Similarly to the first radar 12a, the distance and velocity information calculation unit 44 calculates the distance R from the radar device 1 to the observation target in accordance with the equation (3) by using the beat frequency $F_{sb\_r\_b}$ corresponding to the peak value.

The distance and velocity information calculation unit 44 calculates the relative velocity v between the radar device 1 and the observation target in accordance with the equation (4) by using the Doppler frequency $F_{sb\_v\_b}$ corresponding to the peak value. The distance and velocity information calculation unit 44 generates the distance and velocity information indicating the distance R and the relative velocity v, thereby outputting the distance and velocity information to the detection processing unit 22 as distance and velocity information corresponding to the observation target detected by the second radar 12b.

The frequency $F_{n\_r}$ of the electromagnetic noise is input to the distance and velocity information calculation unit 44 as the beat frequency $F_{sb\_r\_b}$. For this reason, the distance and velocity information output from the distance and velocity information calculation unit 44 to the detection processing unit 22 also includes a distance $R_{n\_b}$ that is a result of erroneous detection of the distance R due to the electromagnetic noise. The distance $R_{n\_b}$ is calculated by using the following equation (7).

$$R_{n\_b} = \frac{c \cdot T_b}{2BW_b} F_{n\_r} \quad (7)$$

The Doppler frequency $F_{n\_v}$ corresponding to the relative velocity between the radar device 1 and the generation source of the electromagnetic noise is input to the distance and velocity information calculation unit 44 as the Doppler frequency $F_{sb\_v\_b}$. For this reason, the distance and velocity information output from the distance and velocity information calculation unit 44 to the detection processing unit 22 also includes a relative velocity $v_{n\_b}$ that is a result of erroneous detection of the relative velocity v due to the electromagnetic noise. The relative velocity $v_{n\_b}$ is calculated by using the following equation (8).

$$v_{n\_b} = \frac{c}{2fb} F_{n\_v} \qquad (8)$$

When the second frequency spectrum calculated by the calculation unit 38 included in the first radar 12*a* is compared with the second frequency spectrum calculated by the calculation unit 38 included in the second radar 12*b*, as illustrated in FIG. 9, a spectrum value corresponding to the observation target detected by using the first radar 12*a* and a spectrum value corresponding to the observation target detected by using the second radar 12*b* overlap each other (match). The detection processing unit 22 determines that the distance and the relative velocity indicated by the distance and velocity information for which they are determined to match are results of detection of the observation target indicating the distance R to the observation target and the relative velocity v with respect to the observation target.

In FIGS. 7 and 8, the sweep time Ta and the sweep time Tb are equal to each other, and the frequency bandwidth BWb is set to twice the frequency bandwidth BWa. For this reason, as illustrated in FIG. 9, the distance $R_{n\_a}$ that is the result of erroneous detection in the first radar 12*a* and the distance $R_{n\_b}$ that is the result of erroneous detection in the second radar 12*b* have a relationship of $R_{n\_a}=2R_{n\_b}$. The detection processing unit 22 determines that the distance and the relative velocity indicated by the distance and velocity information for which they are not determined to match are results of erroneous detection due to the electromagnetic noise.

As described above, in the radar device 1 according to the first embodiment, the frequency modulated signals whose frequency gradients are different from each other are transmitted as the radar signals by the first radar 12*a* and the second radar 12*b*, and the reflected waves of the radar signals reflected by the observation target are received. The distance and velocity information indicating the distance R to the observation target and the relative velocity v with respect to the observation target is calculated for each radar by using the digital data of the beat signal having the frequency of the difference between the frequency of the radar signal and the frequency of the reflected wave. On the basis of a result of comparison of the distance and velocity information calculated by the first radar 12*a* and the second radar 12*b*, the result of detection of the observation target and the result of erroneous detection due to the electromagnetic noise included in the distance and velocity information are discriminated from each other. Since the gradients of the frequencies of the frequency modulated signals transmitted as the radar signals are different from each other, the first radar 12*a* and the second radar 12*b* have different distance resolutions from each other. The results of erroneous detection of the distance and the relative velocity due to the electromagnetic noise are values different for each radars depending on a difference in distance resolution, and do not match. On the other hand, the results of detection of the distance and the relative velocity regarding the same observation target by the first radar 12*a* and the second radar 12*b* are substantially the same value even if there is a difference in distance resolution. As a result, the radar device 1 can discriminate between the result of detection of the observation target and the result of erroneous detection due to the electromagnetic noise included in the distance and velocity information. In addition, since the radar device 1 can generate the distance and velocity information that does not include the result of erroneous detection due to the electromagnetic noise, degradation of detection accuracy of the observation target is reduced. Furthermore, since the distance and velocity information is calculated on the basis of a plurality of radar signals included in one frame, the radar device 1 can perform detection of the observation target by signal processing for one frame.

Second Embodiment

Figure 10:
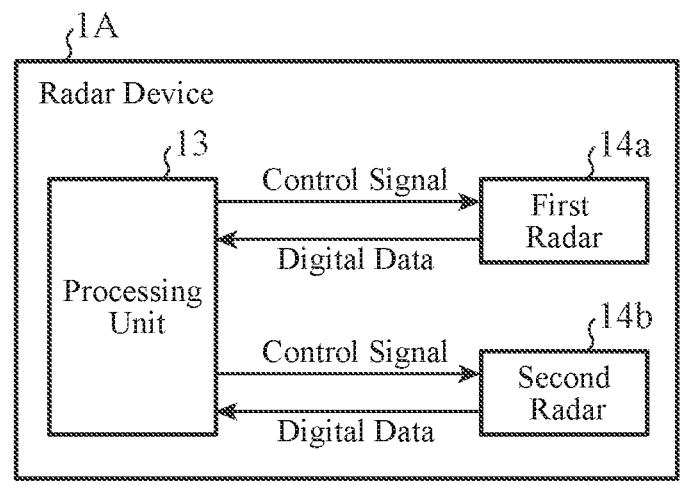
FIG. 10 is a block diagram illustrating a configuration of a radar device according to a second embodiment.

FIG. 10 is a block diagram illustrating a configuration of a radar device 1A according to a second embodiment. The radar device 1A includes a processing unit 13, a first radar 14*a*, and a second radar 14*b*. Note that FIG. 10 illustrates a radar device including two radars, but this is an example. The radar device 1A may include three or more radars. In addition, the first radar 14*a* and the second radar 14*b* may be arranged close to each other or may be arranged apart from each other as long as the same observation target can be observed.

The first radar 14*a* and the second radar 14*b* each transmits a frequency modulated signal whose frequency linearly changes with a lapse of time as a radar signal, and receive a reflected wave of the radar signal reflected by an observation target. The processing unit 13 outputs, to the first radar 14*a* and the second radar 14*b*, a control signal for specifying parameters that determine a transmission cycle of the radar signal and a transmission waveform of the radar signal. In accordance with the control signal from the processing unit 13, the first radar 14*a* and the second radar 14*b* transmit radar signals whose frequency gradients with a lapse of time are different from each other into space.

The first radar 14*a* and the second radar 14*b* each generate a beat signal having a frequency of a difference between a frequency of the radar signal and a frequency of the reflected wave, convert the generated beat signal into digital data, and output the digital data to the processing unit 13. The processing unit 13 calculates distance and velocity information indicating a distance to the observation target and a relative velocity with respect to the observation target by using the digital data of the beat signal output from the first radar 14*a* and the second radar 14*b*, and detects the observation target on the basis of these pieces of the distance and velocity information.

Figure 11:
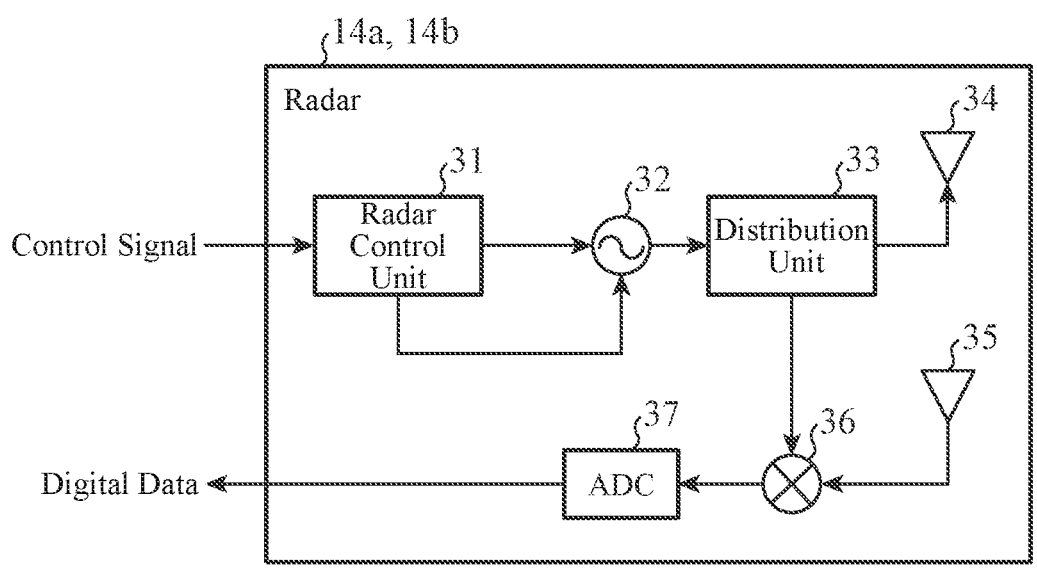
FIG. 11 is a block diagram illustrating each configuration of a first radar and a second radar in the second embodiment.

FIG. 11 is a block diagram illustrating each configuration of the first radar 14*a* and the second radar 14*b*. As illustrated in FIG. 11, each of the first radar 14*a* and the second radar 14*b* includes a radar control unit 31, a signal source 32, a distribution unit 33, a transmission antenna 34, a reception antenna 35, a frequency mixing unit 36, and an ADC 37, but does not include a calculation unit. The digital data of the beat signal converted by the ADC 37 is output to the processing unit 13. Note that the radar control unit 31, the signal source 32, the distribution unit 33, the transmission antenna 34, the reception antenna 35, the frequency mixing unit 36, and the ADC 37 operate similarly to the first embodiment.

Figure 12:
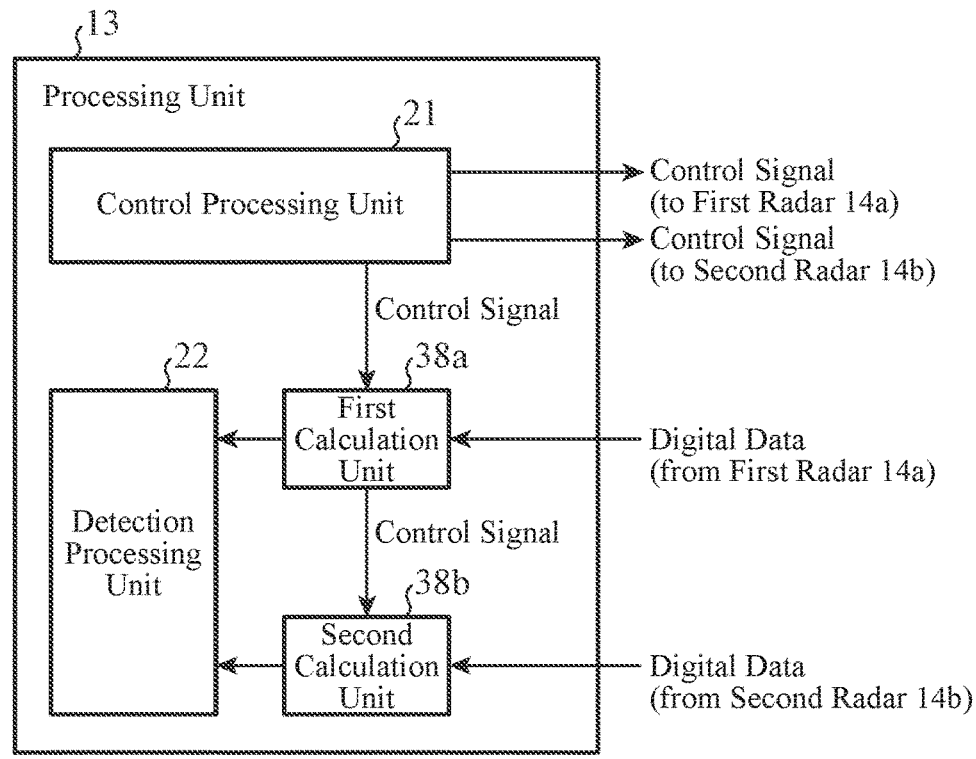
FIG. 12 is a block diagram illustrating a configuration of a processing unit in FIG. 10.

FIG. 12 is a block diagram illustrating a configuration of the processing unit 13. As illustrated in FIG. 12, the processing unit 13 includes a control processing unit 21, a detection processing unit 22, a first calculation unit 38a, and a second calculation unit 38b. The control processing unit 21 outputs a control signal corresponding to each radar to the first radar 14a and the second radar 14b. The detection processing unit 22 discriminates between a result of detection of the observation target and a result of erroneous detection due to electromagnetic noise included in the distance and velocity information, on the basis of a result of comparison between distance and velocity information output from the first calculation unit 38a and distance and velocity information output from the second calculation unit 38b.

The first calculation unit 38a is a calculation unit provided corresponding to the first radar 14a, and the second calculation unit 38b is a calculation unit provided corresponding to the second radar 14b. Similarly to the calculation unit 38 illustrated in FIG. 4, the first calculation unit 38a and the second calculation unit 38b each include a first spectrum calculation unit 41, a second spectrum calculation unit 42, a frequency extraction unit 43, and a distance and velocity information calculation unit 44. The control signal output from the control processing unit 21 to the first radar 14a is also output to the first calculation unit 38a, and the control signal output from the control processing unit 21 to the second radar 14b is also output to the second calculation unit 38b. Note that FIG. 12 illustrates a case where the second calculation unit 38b inputs the control signal via the first calculation unit 38a, but no limitation is intended thereto. For example, the second calculation unit 38b and the control processing unit 21 may be connected so that they can transmit signals to each other, and the second calculation unit 38b may directly input the control signal from the control processing unit 21.

In the first calculation unit 38a, by using the control signal from the control processing unit 21 and the digital data of the beat signal from the first radar 14a, the first spectrum calculation unit 41, the second spectrum calculation unit 42, the frequency extraction unit 43, and the distance and velocity information calculation unit 44 calculate the distance and velocity information in accordance with a procedure illustrated in FIG. 6. In the second calculation unit 38b, by using the control signal from the control processing unit 21 and the digital data of the beat signal from the second radar 14b, the first spectrum calculation unit 41, the second spectrum calculation unit 42, the frequency extraction unit 43, and the distance and velocity information calculation unit 44 calculate the distance and velocity information in accordance with the procedure illustrated in FIG. 6.

Figure 13:
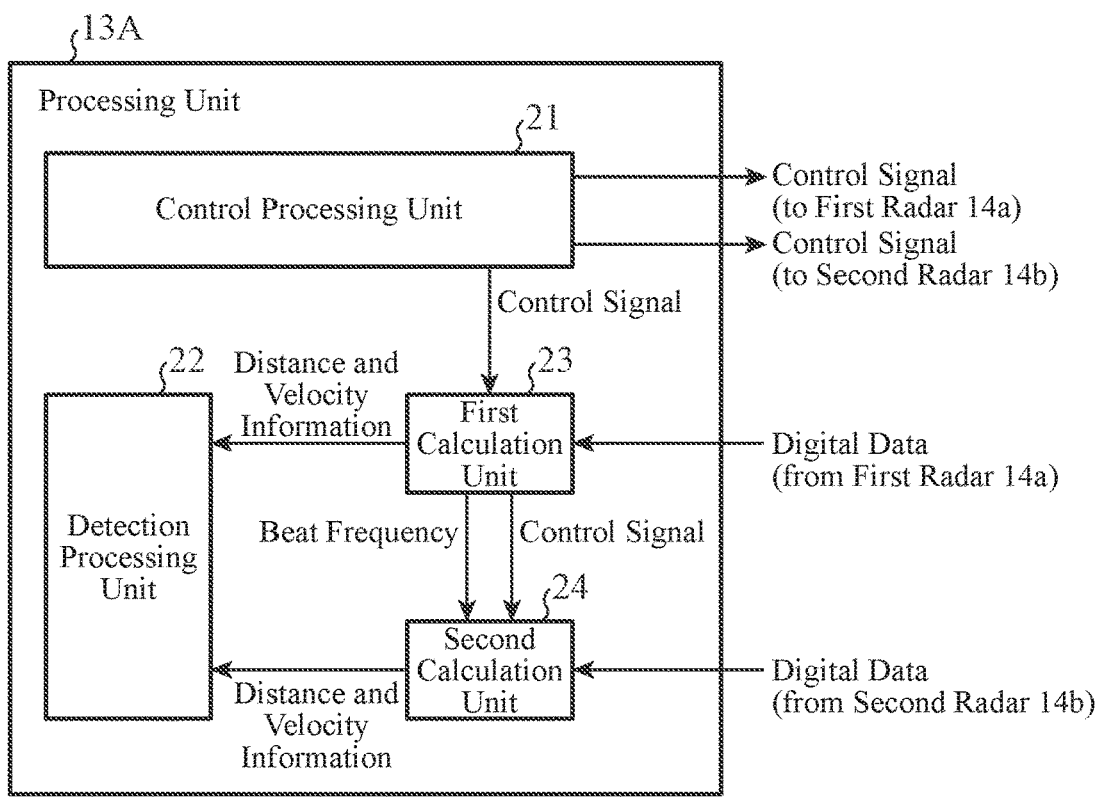
FIG. 13 is a block diagram illustrating a configuration of a modification of the processing unit in the second embodiment.

FIG. 13 is a block diagram illustrating a configuration of a processing unit 13A that is a modification of the processing unit 13 in FIG. 12. As illustrated in FIG. 13, the processing unit 13A includes the control processing unit 21, the detection processing unit 22, a first calculation unit 23, and a second calculation unit 24. The control processing unit 21 outputs a control signal corresponding to each radar to the first radar 14a and the second radar 14b. The detection processing unit 22 discriminates between the result of detection of the observation target and the result of erroneous detection due to the electromagnetic noise included in the distance and velocity information, on the basis of a result of comparison between distance and velocity information output from the first calculation unit 23 and distance and velocity information output from the second calculation unit 24.

The first calculation unit 23 is a calculation unit provided corresponding to the first radar 14a, and the second calculation unit 24 is a calculation unit provided corresponding to the second radar 14b. The control signal output from the control processing unit 21 to the first radar 14a is also output to the first calculation unit 23, and the control signal output from the control processing unit 21 to the second radar 14b is also output to the second calculation unit 24. Note that FIG. 13 illustrates a case where the second calculation unit 24 inputs the control signal via the first calculation unit 23, but no limitation is intended thereto. For example, the second calculation unit 24 and the control processing unit 21 may be connected so that they can transmit signals to each other, and the second calculation unit 24 may directly input the control signal from the control processing unit 21.

Figure 14:
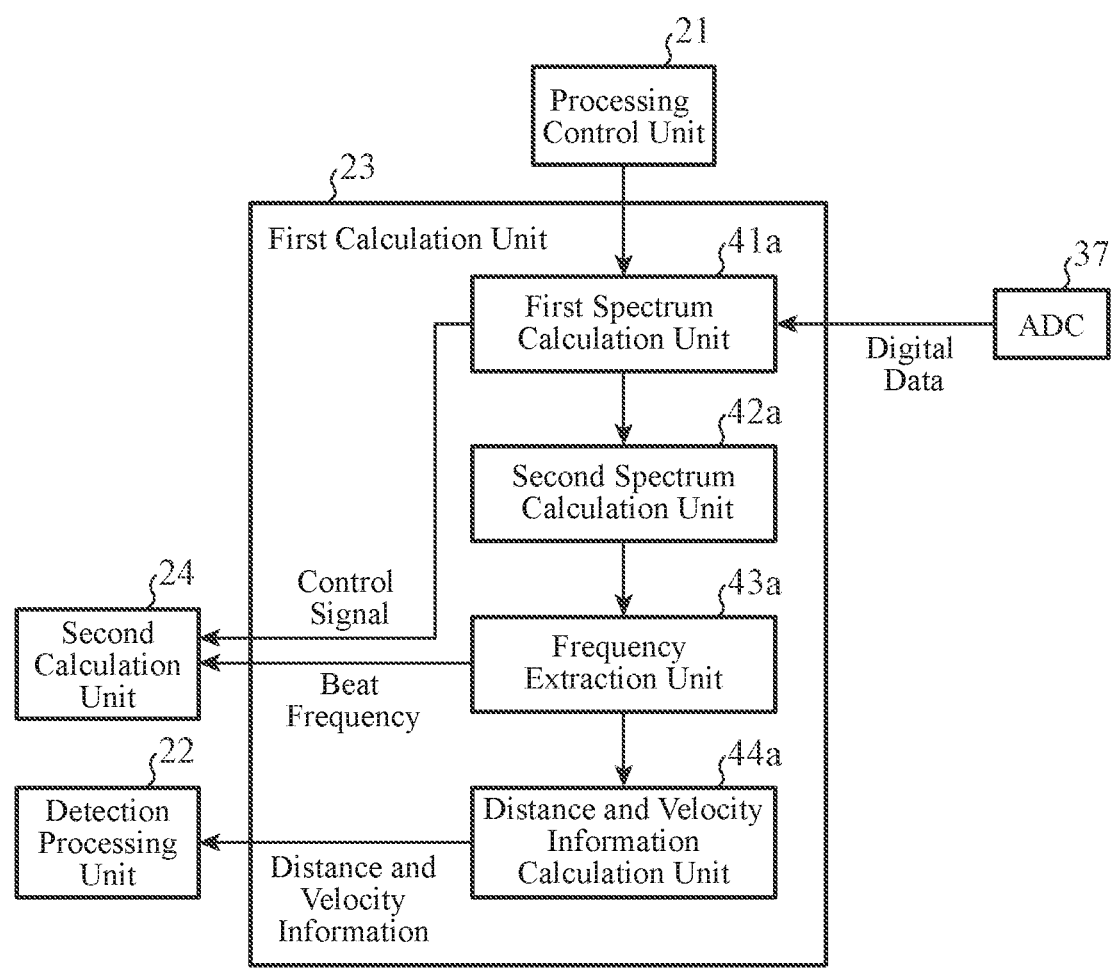
FIG. 14 is a block diagram illustrating a configuration of a first calculation unit in FIG. 13.

FIG. 14 is a block diagram illustrating a configuration of the first calculation unit 23. As illustrated in FIG. 14, the first calculation unit 23 includes a first spectrum calculation unit 41a, a second spectrum calculation unit 42a, a frequency extraction unit 43a, and a distance and velocity information calculation unit 44a. The first spectrum calculation unit 41a calculates a plurality of first frequency spectra by performing Fourier transform in the distance direction on the digital data for each transmission cycles of the radar signal indicated by the control signal among the digital data of the beat signal output from the ADC 37 included in the first radar 14a. In addition, the first spectrum calculation unit 41a outputs the control signal from the control processing unit 21 to the second radar 14b to the second calculation unit 24.

The second spectrum calculation unit 42a calculates a second frequency spectrum by performing Fourier transform in the relative velocity direction on the plurality of first frequency spectra calculated by the first spectrum calculation unit 41a. The frequency extraction unit 43a extracts a beat frequency and a Doppler frequency corresponding to a peak value of the second frequency spectrum, and outputs the extracted beat frequency and Doppler frequency to the distance and velocity information calculation unit 44a. Furthermore, the frequency extraction unit 43a also outputs the extracted beat frequency to the second calculation unit 24.

The distance and velocity information calculation unit 44a calculates the distance R to the observation target on the basis of the beat frequency output from the frequency extraction unit 43a, and calculates the relative velocity v with respect to the observation target on the basis of the Doppler frequency output from the frequency extraction unit 43a. The distance and velocity information calculation unit 44a outputs distance and velocity information indicating the calculated distance R and relative velocity v to the detection processing unit 22.

Figure 15:
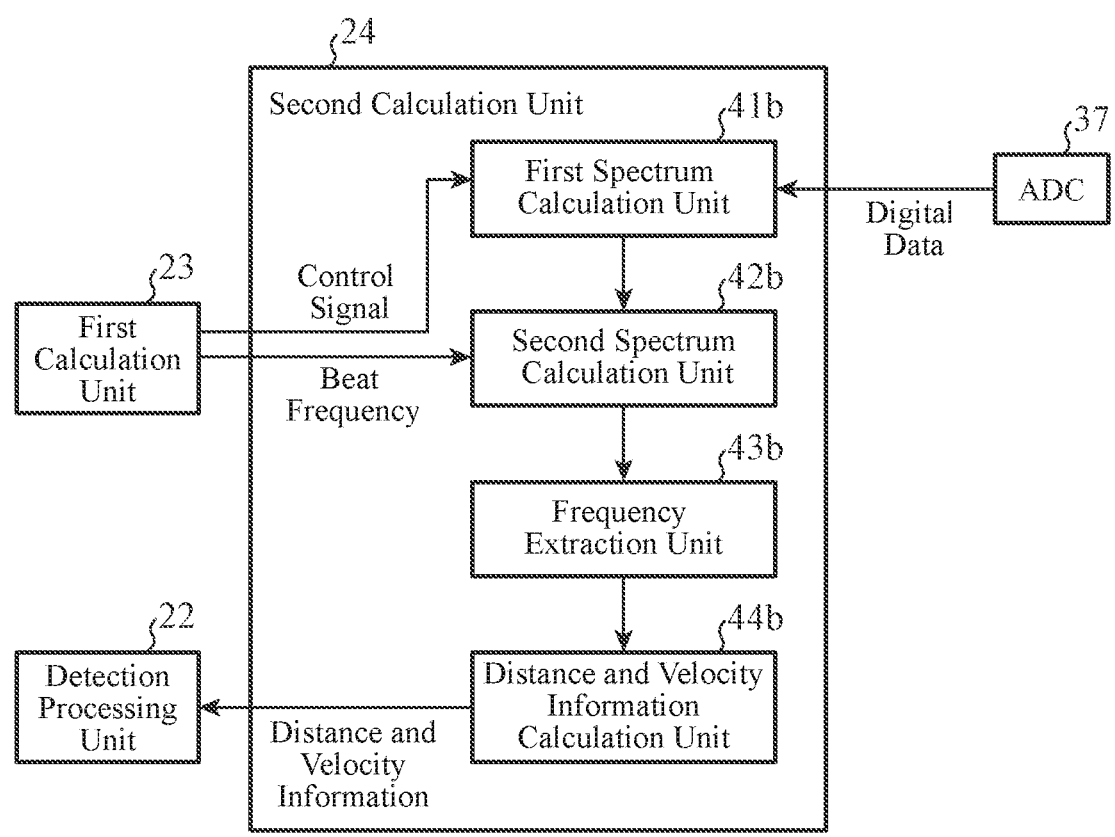
FIG. 15 is a block diagram illustrating a configuration of a second calculation unit in FIG. 13.

FIG. 15 is a block diagram illustrating a configuration of the second calculation unit 24. As illustrated in FIG. 15, the second calculation unit 24 includes a first spectrum calculation unit 41b, a second spectrum calculation unit 42b, a frequency extraction unit 43b, and a distance and velocity information calculation unit 44b. The first spectrum calculation unit 41b calculates a plurality of first frequency spectra by performing Fourier transform in the distance direction on the digital data for each transmission cycles of the radar signal indicated by the control signal input via the first calculation unit 23 among the digital data of the beat signal output from the ADC 37 included in the second radar 14b.

The second spectrum calculation unit 42b calculates the second frequency spectrum by performing Fourier transform in the relative velocity direction only on a spectrum value corresponding to the beat frequency extracted by the frequency extraction unit 43a among a plurality of spectrum values included in the plurality of first frequency spectra calculated by the first spectrum calculation unit 41b.

The frequency extraction unit 43b extracts a beat frequency and a Doppler frequency corresponding to a peak value in the second frequency spectrum, and outputs the extracted beat frequency and Doppler frequency to the distance and velocity information calculation unit 44b. The distance and velocity information calculation unit 44b calculates the distance R to the observation target on the basis of the beat frequency output from the frequency extraction unit 43b, and calculates the relative velocity v with respect to the observation target on the basis of the Doppler frequency output from the frequency extraction unit 43b. The distance and velocity information calculation unit 44b outputs distance and velocity information indicating the distance R and relative velocity v to the detection processing unit 22.

Figure 16:
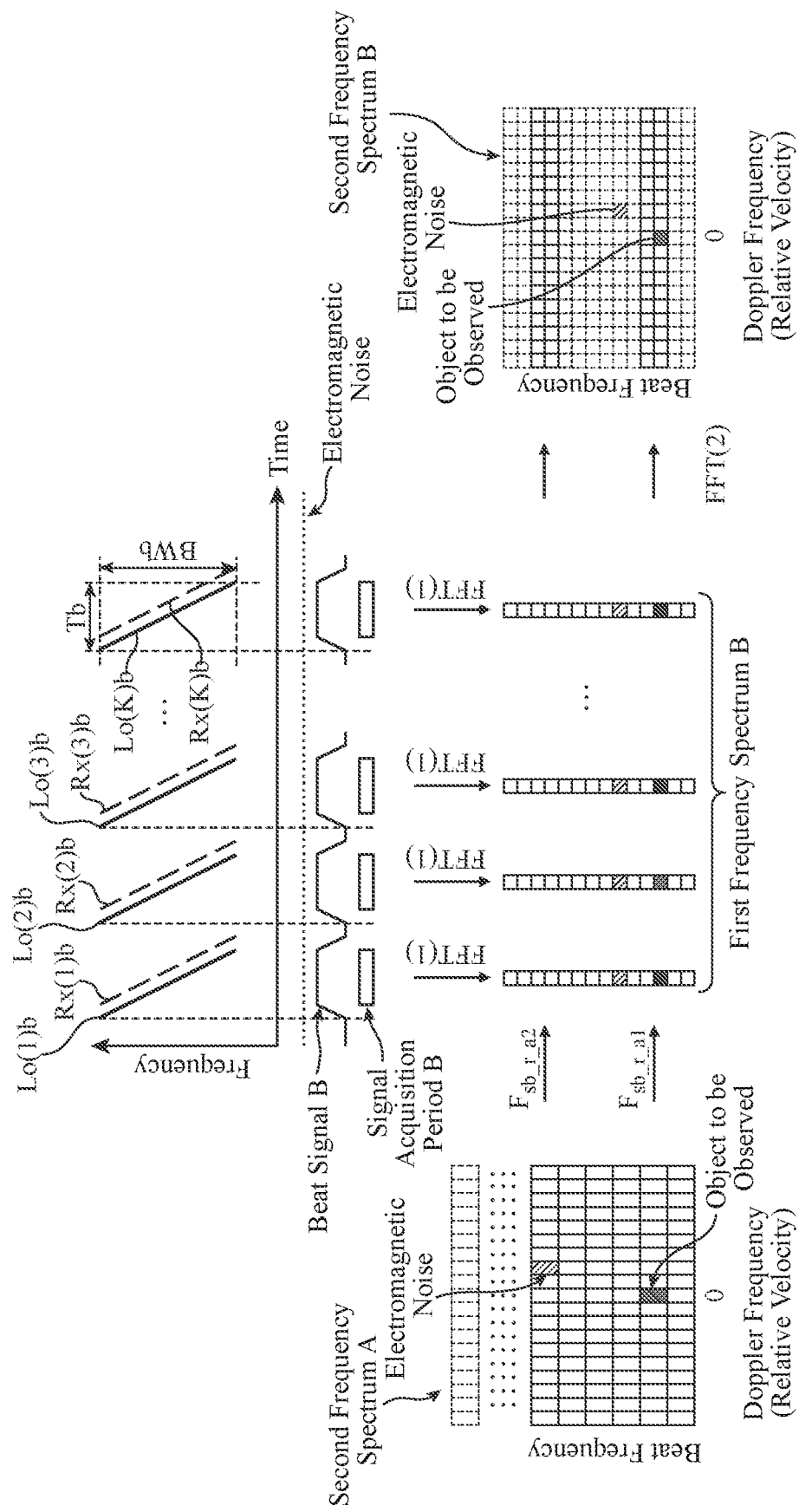
FIG. 16 is an explanatory diagram illustrating an outline of processing by the first calculation unit and the second calculation unit in FIG. 13.

FIG. 16 is an explanatory diagram illustrating an outline of processing by the first calculation unit 23 and the second calculation unit 24, and illustrates a case where the number of objects of observation of the radar device 1A is one for simplicity of description. However, the number of objects of observation of the radar device 1A may be two or more. One electromagnetic noise that is a continuous wave having a constant frequency is indicated; however, a plurality of electromagnetic noises that is continuous waves having constant frequencies may be input to the ADC 37. In FIG. 16, FFT(1) indicates Fourier transform in the distance direction, and FFT(2) indicates Fourier transform in the relative velocity direction.

In the first calculation unit 23, the second spectrum calculation unit 42a calculates a second frequency spectrum A including a spectrum value corresponding to the observation target and a spectrum value corresponding to the electromagnetic noise as illustrated in FIG. 16 in accordance with the procedure described above with reference to FIG. 7. The frequency extraction unit 43a extracts the beat frequency $F_{sb\_r\_a}$ and the Doppler frequency $F_{sb\_v\_a}$ corresponding to a peak value in the second frequency spectrum A, outputs the extracted beat frequency $F_{sb\_r\_a}$ and Doppler frequency $F_{sb\_v\_a}$ to the distance and velocity information calculation unit 44a, and further outputs the beat frequency $F_{sb\_r\_a}$ to the second calculation unit 24. In FIG. 16, information indicating the beat frequency output from the frequency extraction unit 43a to the second calculation unit 24 includes a beat frequency $F_{sb\_r\_a2}$ corresponding to the frequency of the electromagnetic noise in addition to a beat frequency $F_{sb\_r\_a1}$ corresponding to the distance R to the observation target.

In the second calculation unit 24, the first spectrum calculation unit 41b calculates K first frequency spectra B as illustrated in FIG. 16 by performing Fourier transform in the distance direction on the digital data of the beat signal B in accordance with the procedure described above with reference to FIG. 8. The K first frequency spectra B are output to the second spectrum calculation unit 42b. The second spectrum calculation unit 42b calculates a second frequency spectrum B by performing Fourier transform in the relative velocity direction only on spectrum values corresponding to the beat frequencies $F_{sb\_r\_a1}$ and $F_{sb\_r\_a2}$ output from the frequency extraction unit 43a among a plurality of spectrum values included in the K first frequency spectra B.

In FIG. 16, the gradient of the frequency of the radar signal (frequency modulated signal) transmitted from the second radar 14b is twice the gradient of the frequency of the radar signal transmitted from the first radar 14a, and the distance resolution is twice. The second spectrum calculation unit 42b calculates four second frequency spectra B as illustrated in FIG. 16 by performing Fourier transform in the relative velocity direction on spectrum values at four locations corresponding to the beat frequencies $F_{sb\_r\_a1}$ and $F_{sb\_r\_a2}$ among the plurality of spectrum values included in the K first frequency spectra B.

The frequency extraction unit 43b extracts the beat frequency $F_{sb\_r\_b}$ and the Doppler frequency $F_{sb\_v\_b}$ corresponding to peak values in the four second frequency spectra B, and outputs the extracted beat frequency $F_{sb\_r\_b}$ and Doppler frequency $F_{sb\_v\_b}$ to the distance and velocity information calculation unit 44b. Using the beat frequency $F_{sb\_r\_b}$ and the Doppler frequency $F_{sb\_v\_b}$ extracted from the four second frequency spectra B, the distance and velocity information calculation unit 44b calculates the distance and velocity information in accordance with the equations (3) to (6).

The detection processing unit 22 discriminates between the result of detection of the observation target and the result of erroneous detection due to the electromagnetic noise included in the distance and velocity information, on the basis of a result of comparison between distance and velocity information from the first calculation unit 23 and distance and velocity information from the second calculation unit 24. For example, in a case where it is determined that the distances and the relative velocities indicated by both pieces of the distance and velocity information match, the detection processing unit 22 determines that the distance and the relative velocity indicated by these pieces of distance and velocity information are the results of detection of the observation target. In addition, in a case where it is determined that the distances and the relative velocities indicated by the pieces of the distance and velocity information do not match, the detection processing unit 22 determines that it is the result of erroneous detection due to the electromagnetic noise.

Next, a hardware configuration to implement a function of the radar device 1A will be described.

Functions of the control processing unit 21, the detection processing unit 22, the first calculation unit 38a, and the second calculation unit 38b in the radar device 1A are implemented by a processing circuit. That is, the radar device 1A includes the processing circuit for executing each processing step from step ST1 to step ST4 illustrated in FIG. 5. The processing circuit may be dedicated hardware, or a central processing unit (CPU) to execute a program stored in a memory.

Figure 17A:
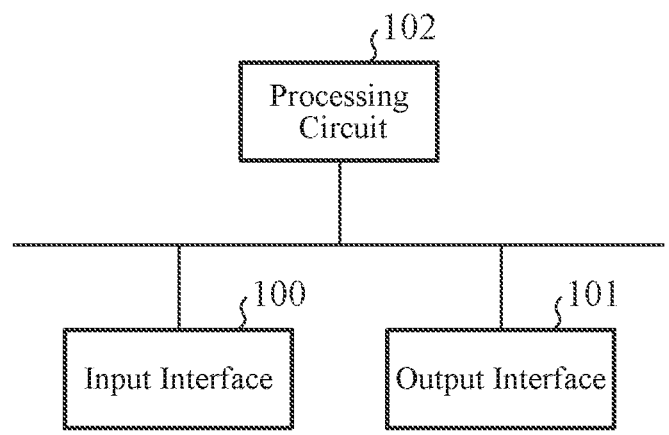
FIG. 17A is a block diagram illustrating a hardware configuration to implement a function of the radar device according to the second embodiment.
Figure 17B:
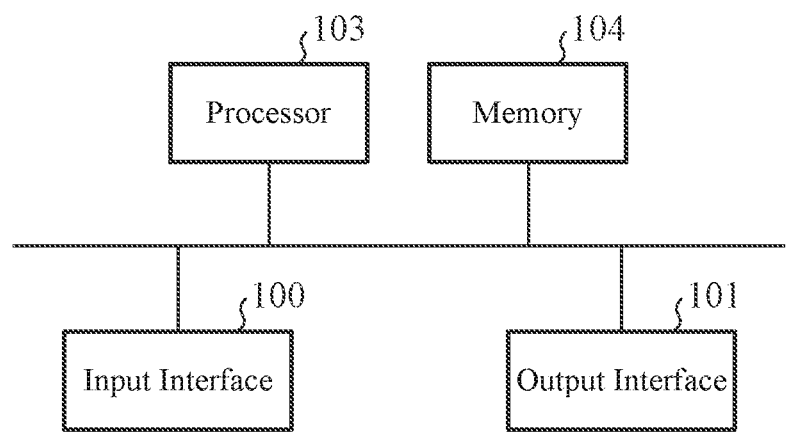
FIG. 17B is a block diagram illustrating a hardware configuration to execute software to implement the function of the radar device according to the second embodiment.

FIG. 17A is a block diagram illustrating a hardware configuration to implement a function of the radar device 1A in FIG. 10. In addition, FIG. 17B is a block diagram illustrating a hardware configuration to execute software to implement the function of the radar device 1A in FIG. 10. In FIGS. 17A and 17B, an input interface 100 is, for example, an interface to relay the digital data of the beat signals output from the first radar 14a and the second radar 14b and input the digital data to the processing unit 13. An output interface 101 is an interface to relay the control signal output from the processing unit 13 and output the control signal to the first radar 14a and the second radar 14b.

In a case where the processing circuit is a processing circuitry 102 of a dedicated hardware illustrated in FIG. 17A, examples of the processing circuitry 102 include a single circuit, a composite circuit, a programmed processor, a parallel-programmed processor, an application specific integrated circuit (ASIC), a field-programmable gate array (FPGA), or a combination thereof. The functions of the control processing unit 21, the detection processing unit 22, the first calculation unit 38a, and the second calculation unit 38b in the radar device 1A may be implemented by separate processing circuitries, or these functions may be collectively implemented by one processing circuitry.

In a case where the processing circuitry is a processor 103 illustrated in FIG. 17B, the functions of the control processing unit 21, the detection processing unit 22, the first calculation unit 38a, and the second calculation unit 38b in the radar device 1A are implemented by software, firmware, or a combination of software and firmware. Note that the software or the firmware is described as a program and stored in a memory 104.

The processor 103 implements the functions of the control processing unit 21, the detection processing unit 22, the first calculation unit 38a, and the second calculation unit 38b in the radar device 1A, by reading and executing the program stored in the memory 104. For example, the radar device 1A includes the memory 104 for storing a program by which the processing from step ST1 to step ST4 in the flowchart illustrated in FIG. 5 is resultantly executed when executed by the processor 103. These programs cause a computer to execute procedures or methods performed by the control processing unit 21, the detection processing unit 22, the first calculation unit 38a, and the second calculation unit 38b. The memory 104 may be a computer-readable storage medium storing a program for causing a computer to function as the control processing unit 21, the detection processing unit 22, the first calculation unit 38a, and the second calculation unit 38b.

Examples of the memory 104 include a nonvolatile or volatile semiconductor memory such as random access memory (RAM), read only memory (ROM), flash memory, erasable programmable read only memory (EPROM), and electrically-EPROM (EEPROM), a magnetic disk, a flexible disk, an optical disk, a compact disk, a mini disk, a DVD, and the like.

A part of the functions of the control processing unit 21, the detection processing unit 22, the first calculation unit 38a, and the second calculation unit 38b in the radar device 1A may be implemented by dedicated hardware, and a part of the functions may be implemented by software or firmware. For example, the functions of the control processing unit 21 and the detection processing unit 22 are implemented by the processing circuitry 102 that is dedicated hardware, and the functions of the first calculation unit 38a and the second calculation unit 38b are implemented by the processor 103 reading and executing a program stored in the memory 104. As described above, the processing circuitry can implement the functions by the hardware, software, firmware, or a combination thereof.

As described above, in the radar device 1A according to the second embodiment, the processing unit 13 includes the first calculation unit 38a and the second calculation unit 38b. The first calculation unit 38a calculates the distance and velocity information by using the digital data of the beat signal output from the first radar 14a, and the second calculation unit 38b calculates the distance and velocity information by using the digital data of the beat signal output from the second radar 14b. The processing unit 13 discriminates between the result of detection of the observation target and the result of erroneous detection by using the distance and velocity information calculated by the first calculation unit 38a and the distance and velocity information calculated by the second calculation unit 38b. As a result, the radar device 1A can discriminate the erroneous detection due to electromagnetic noise, similarly to the first embodiment.

In addition, in the radar device 1A according to the second embodiment, the second spectrum calculation unit 42b calculates the second frequency spectrum B by performing Fourier transform in the relative velocity direction on the digital data corresponding to the beat frequency extracted by the frequency extraction unit 43a among the digital data of the first frequency spectra B. The frequency extraction unit 43a extracts the beat frequency and the Doppler frequency corresponding to the peak value of the second frequency spectrum B, and outputs the extracted beat frequency to the second spectrum calculation unit 42b. As a result, the radar device 1A can reduce a processing load required for calculating the second frequency spectrum as compared with the radar device 1 according to the first embodiment. However, this is an example, and beat frequency information calculated by the distance and velocity information calculation unit 44 included in one radar in FIG. 4 described in the first embodiment may be used in a distance and velocity information calculation unit 44 included in a radar other than the one radar. The beat frequency information output from the distance and velocity information calculation unit 44 may be input via the processing unit 11 or may be directly input from the radar.

Note that in a case where the processing unit 13A includes three or more calculation units, the beat frequency information extracted by a frequency extraction unit included in any of the calculation units may be used by a second spectrum calculation unit included in each of remaining calculation units.

Third Embodiment

Figure 18:
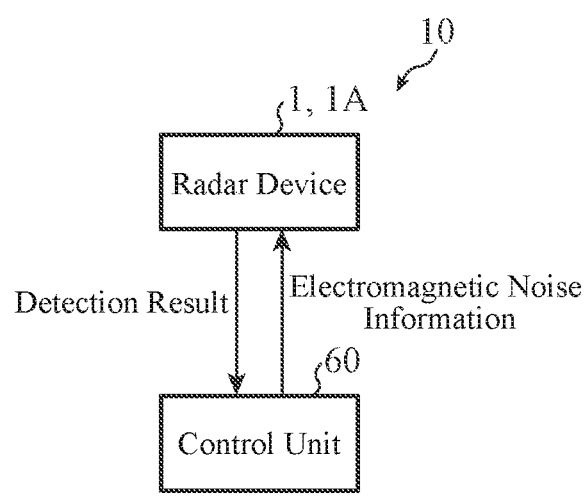
FIG. 18 is a block diagram illustrating a configuration of an in-vehicle device according to a third embodiment.

FIG. 18 is a block diagram illustrating a configuration of an in-vehicle device according to a third embodiment. An in-vehicle device 10 is mounted on a vehicle such as an automobile, and includes a radar device 1 or 1A and a control unit 60 as illustrated in FIG. 18. The control unit 60 controls an engine, a steering, a brake, or various sensors of an automobile. Examples of the various sensors include a radar device, a lidar, a camera, an ultrasonic sensor, and the like provided separately from the radar device 1 or 1A.

The control unit 60 acquires electromagnetic noise information in a control target device, and outputs the electromagnetic noise information to the radar device 1 or 1A. The electromagnetic noise information may be information indicating presence of electromagnetic noise or information indicating a frequency of the electromagnetic noise. In the radar device 1 or 1A, a first radar and a second radar perform individual operations independent of each other or a cooperative operation. The cooperative operation is, for example, an operation of enhancing resolution of a function of detecting an observation target by causing the radars to cooperate with each other.

The radar device 1 or 1A causes the first radar and the second radar to transmit frequency modulated signals whose frequency gradients are different from each other as radar signals. A calculation unit included in the radar device 1 or 1A calculates a first frequency spectrum and a second frequency spectrum, and calculates distance and velocity information for each radar on the basis of a beat frequency and a Doppler frequency corresponding to a peak value of the second frequency spectrum. A processing unit included in the radar device 1 or 1A discriminates between a result of detection of the observation target and a result of erroneous detection due to the electromagnetic noise included in the distance and velocity information, on the basis of a result of comparison of the distance and velocity information calculated for each radar.

For example, in a situation where no electromagnetic noise is generated in a previous stage before the electromagnetic noise information is acquired from the control unit 60, the radar device 1 or 1A performs detection of the observation target by individually operating the first radar and the second radar and transmitting frequency modulated signals whose frequency gradients are the same. When the electromagnetic noise is generated and the electromagnetic noise information is acquired from the control unit 60, the radar device 1 or 1A performs detection of the observation target described in the first embodiment or the second embodiment by causing the first radar and the second radar to perform the cooperative operation and transmitting the frequency modulated signals whose frequency gradients are different from each other. Since the radar device 1 or 1A discriminates between the result of detection of the observation target and the result of erroneous detection due to the electromagnetic noise included in the distance and velocity information, only the result of detection of the observation target is output. As described above, by changing the processing of the radar device 1 or 1A depending on presence or absence of generation of the electromagnetic noise, a resource of the radar device can be effectively used.

The processing unit included in the radar device 1 or 1A may output a distance R to the observation target and a relative velocity v with respect to the observation target to the control unit 60, or may output the result of erroneous detection due to the electromagnetic noise to the control unit 60. For example, the control unit 60 predicts a distance from an automobile on which the in-vehicle device 10 is mounted to the observation target by using the distance R and the relative velocity v, and determines a possibility that the automobile and the observation target come into contact with each other on the basis of a result of the prediction. When determining that there is a high possibility that the automobile and the observation target come into contact with each other, the control unit 60 controls traveling of the automobile to avoid contact with the observation target. For example, the control unit 60 operates the brake of the automobile or controls the steering to change a traveling direction of the automobile.

The control unit 60 can sequentially predict a state of a course of the automobile by using information on detection of an object present around the automobile detected by various sensors, and the distance R to the observation target and the relative velocity v with respect to the observation target acquired from the radar device 1 or 1A, and can execute automatic driving of the automobile on the basis of a result of the prediction.

Since the radar device 1 or 1A discriminates between the result of detection of the observation target and the result of erroneous detection due to the electromagnetic noise, it is possible to output only the result of detection of the observation target. However, the determination function may be degraded depending on a situation of generation of the electromagnetic noise. For example, in the second frequency spectrum, in a case where the number of peak values corresponding to the result of erroneous detection due to the electromagnetic noise exceeds a threshold value, the processing unit included in the radar device 1 or 1A determines that the reliability of the result of detection of the observation target (the distance R and the relative velocity v) is low, and in a case where the number of peak values is less than or equal to the threshold value, the processing unit determines that the reliability of the result of detection of the observation target is high.

When determining that the reliability of the result of detection of the observation target acquired from the radar device 1 or 1A is high, the control unit 60 executes automatic driving of the automobile by using the distance R and the relative velocity v indicated by the result of detection of the observation target. When determining that the reliability of the result of detection of the observation target is low, the control unit 60 executes automatic driving by preferentially using a result of detection of another sensor (for example, lidar or camera) mounted on the automobile rather than the result of detection of the observation target.

As described above, in the in-vehicle device 10 according to the third embodiment, when the electromagnetic noise information is output from the control unit 60, the radar device 1 or 1A transmits frequency modulated signals whose frequency gradients are different from each other as the radar signals by the first radar and the second radar, and performs detection of the observation target described in the first embodiment or the second embodiment. The radar device 1 or 1A can be operated depending on the electromagnetic noise information acquired by the control unit 60.

In the in-vehicle device 10 according to the third embodiment, the control unit 60 controls the vehicle on the basis of the results of detection of the distance R to the observation target and the relative velocity v with respect to the observation target, and the result of erroneous detection due to the electromagnetic noise. As a result, the control unit 60 can control the vehicle depending on the situation of generation of the electromagnetic noise.

Note that combination of the embodiments, modification of any components of each of the embodiments, or omission of any components in each of the embodiments are possible.

INDUSTRIAL APPLICABILITY

The radar device according to the present disclosure can be used as, for example, a sensor that is mounted on a vehicle and detects an obstacle.

REFERENCE SIGNS LIST

1 and 1A: Radar device, 10: In-vehicle device, 11, 13, and 13A: Processing unit, 12a and 14a: First radar, 12b and 14b: Second radar, 21: Control processing unit, 22: Detection processing unit, 23 and 38a: First calculation unit, 24 and 38b: Second calculation unit, 31: Radar control unit, 32: Signal source, 33: Distribution unit, 34: Transmission antenna, 35: Reception antenna, 36: Frequency mixing unit, 37: ADC, 38: Calculation unit, 41, 41a, and 41b: First spectrum calculation unit, 42, 42a, and 42b: Second spectrum calculation unit, 43, 43a, and 43b: Frequency extraction unit, 44, 44a, and 44b: Distance and velocity information calculation unit, 60: Control unit, 100: Input interface, 101: Output interface, 102: Processing circuitry, 103: Processor, 104: Memory

What is claimed is:
1. A radar device comprising:
a plurality of radars each to transmit, as a radar signal, a frequency modulated signal whose frequency linearly changes with a lapse of time, and receive a reflected wave of the radar signal reflected by an observation target; and
processing circuitry configured to:

calculate distance and velocity information indicating a distance to the observation target and a relative velocity with respect to the observation target, by using digital data of a beat signal having a frequency of a difference between a frequency of the radar signal and a frequency of the reflected wave, and detect the observation target on a basis of the distance and velocity information, wherein:

the radars are configured to transmit, as radar signals, frequency modulated signals whose frequency gradients with a lapse of time are different from each other, each ratio of absolute values of the frequency gradients being other than 1, and the processing circuitry is configured to calculate a first frequency spectrum obtained by performing Fourier transform in a distance direction on the digital data of the beat signal and a second frequency spectrum obtained by performing Fourier transform in a relative velocity direction on the first frequency spectrum, and calculate, for each of the radars, the distance and velocity information on a basis of a beat frequency and a Doppler frequency corresponding to a peak value in the second frequency spectrum, and the processing circuitry is configured to compare the distance and velocity information calculated for each of the radars, the processing circuitry is configured to, when the distance and velocity included in the distance and velocity information match between the radars, determine that the distance and velocity included in the distance and velocity information are the distance to the observation target and the relative velocity with respect to the observation target, and the processing circuitry is configured to, when the distance and velocity included in the distance and velocity information do not match between the radars due to their differences corresponding to differences in frequency gradients of radar signals, determine that the distance and velocity included in the distance and velocity information result from erroneous detection due to electromagnetic noise.

2. The radar device according to claim 1, wherein:
the radars include:
  a beat signal generator configured to generate the beat signal; and
  a converter configured to convert the beat signal into digital data and outputs the digital data, and
the processing circuitry is further configured to:
  calculate the first frequency spectrum obtained by performing Fourier transform in the distance direction on the digital data of the beat signal;
  calculate the second frequency spectrum obtained by performing Fourier transform in the relative velocity direction on the first frequency spectrum;
  extract the beat frequency and the Doppler frequency corresponding to the peak value from the second frequency spectrum; and
calculate the distance and velocity information on the basis of the beat frequency and the Doppler frequency corresponding to the peak value.

3. The radar device according to claim 2, wherein the processing circuitry is provided to each of the radars includes calculators, each of which is configured to calculate the distance and velocity information for a corresponding one of the radars.

4. The radar device according to claim 3, wherein the processing circuitry is further configured to:

calculate the second frequency spectrum by performing Fourier transform in the relative velocity direction on a spectrum value corresponding to the beat frequency corresponding to the peak value among a plurality of spectrum values of the first frequency spectrum, and extract the beat frequency and the Doppler frequency corresponding to the peak value.

5. An in-vehicle device comprising:
the radar device according to claim 4 mounted on a vehicle; and
a controller mounted on the vehicle, configured to acquire electromagnetic noise information and output the electromagnetic noise information to the radar device,
wherein:
the radars are configured to, when the electromagnetic noise information is output from the controller, transmit frequency modulated signals whose frequency gradients are different from each other as the radar signals, and the processing circuitry is configured to calculate the first frequency spectrum and the second frequency spectrum, and calculate the distance and velocity information for each of the radars on the basis of the beat frequency and the Doppler frequency corresponding to the peak value in the second frequency spectrum, and the processing circuitry is configured to compare the distance and velocity information calculated for each of the radars, when the distance and velocity included in the distance and velocity information match between the radars, the processing circuitry is configured to determine that the distance and velocity included in the distance and velocity information are the distance to the observation target and the relative velocity with respect to the observation target, and the processing circuitry is configured to, when the distance and velocity included in the distance and velocity information do not match between the radars due to their differences corresponding to differences in frequency gradients of radar signals, the processing circuitry, determine that the distance and velocity included in the distance and velocity information result from erroneous detection due to electromagnetic noise.

6. The in-vehicle device according to claim 5, wherein the controller is configured to control the vehicle on a basis of results of detection of the distance to the observation target and the relative velocity with respect to the observation target output from the processing circuitry, and the result of erroneous detection due to the electromagnetic noise.

7. An in-vehicle device comprising:
the radar device according to claim 3 mounted on a vehicle; and
a controller mounted on the vehicle, configured to acquire electromagnetic noise information and output the electromagnetic noise information to the radar device,
wherein:
the radars are configured to, when the electromagnetic noise information is output from the controller, transmit frequency modulated signals whose frequency gradients are different from each other as the radar signals, and the processing circuitry is configured to calculate the first frequency spectrum and the second frequency spectrum, and calculates the distance and velocity information for each of the radars on the basis of the beat frequency and the Doppler frequency corresponding to the peak value in the second frequency spectrum, and the processing circuitry is configured to compare the distance and velocity information calculated for each of the radars, when the distance and velocity included in the distance and velocity information match between the radars, the processing circuitry is configured to determine that the distance and velocity included in the distance and velocity information are the distance to the observation target and the relative velocity with respect to the observation target, and the processing circuitry is configured to, when the distance and velocity included in the distance and velocity information do not match between the radars due to their differences corresponding to differences in frequency gradients of radar signals, determine that the distance and velocity included in the distance and velocity information result from erroneous detection due to electromagnetic noise.

8. The in-vehicle device according to claim 7, wherein the controller is configured to control the vehicle on a basis of results of detection of the distance to the observation target and the relative velocity with respect to the observation target output from the processing circuitry, and the result of erroneous detection due to the electromagnetic noise.

9. An in-vehicle device comprising:
the radar device according to claim 2 mounted on a vehicle; and
a controller mounted on the vehicle, configured to acquire electromagnetic noise information and output the electromagnetic noise information to the radar device,
wherein:
the radars are configured to, when the electromagnetic noise information is output from the controller, transmit frequency modulated signals whose frequency gradients are different from each other as the radar signals, and the processing circuitry is configured to calculate the first frequency spectrum and the second frequency spectrum, and calculates the distance and velocity information for each of the radars on the basis of the beat frequency and the Doppler frequency corresponding to the peak value in the second frequency spectrum, and the processing circuitry is configured to compare the distance and velocity information calculated for each of the radars, when the distance and velocity included in the distance and velocity information match between the radars, the processing circuitry is configured to determine that the distance and velocity included in the distance and velocity information are the distance to the observation target and the relative velocity with respect to the observation target, and the processing circuitry is configured to, when the distance and velocity included in the distance and velocity information do not match between the radars due to their differences corresponding to differences in frequency gradients of radar signals, determine that the distance and velocity included in the distance and velocity information result from erroneous detection due to electromagnetic noise.

10. The in-vehicle device according to claim 9, wherein the controller is configured to control the vehicle on a basis of results of detection of the distance to the observation target and the relative velocity with respect to the observation target output from the processing circuitry, and the result of erroneous detection due to the electromagnetic noise.

11. An in-vehicle device comprising:
the radar device according to claim 1 mounted on a vehicle; and
a controller, mounted on the vehicle, configured to acquire electromagnetic noise information and output the electromagnetic noise information to the radar device,
wherein:
the radars are configured to, when the electromagnetic noise information is output from the controller, transmit frequency modulated signals whose frequency gradients are different from each other as radar signals, and the processing circuitry is configured to calculate the first frequency spectrum and the second frequency spectrum, and calculate the distance and velocity information for each of the radars on the basis of the beat frequency and the Doppler frequency corresponding to the peak value in the second frequency spectrum, and the processing circuitry is configured to compare the distance and velocity information calculated for each of the radars, when the distance and velocity included in the distance and velocity information match between the radars, the processing circuitry is configured to determine that the distance and velocity included in the distance and velocity information are the distance to the observation target and the relative velocity with respect to the observation target, and the processing circuitry is configured to, when the distance and velocity included in the distance and velocity information do not match between the radars due to their differences corresponding to differences in frequency gradients of radar signals, determine that the distance and velocity included in the distance and velocity information result from erroneous detection due to electromagnetic noise.

12. The in-vehicle device according to claim 11, wherein the controller is configured to control the vehicle on a basis of results of detection of the distance to the observation target and the relative velocity with respect to the observation target output from the processing circuitry, and the result of erroneous detection due to the electromagnetic noise.

13. An observation target detecting method comprising:
transmitting, by a plurality of radars of a radar device, as radar signals, frequency modulated signals whose frequency gradients with a lapse of time are different from each other, each ratio of absolute values of the frequency gradients being other than 1,
receiving, by the plurality of radars, reflected waves of the radar signals reflected by the observation target,
calculating, by processing circuitry of the radar device, a first frequency spectrum obtained by performing Fourier transform in a distance direction on digital data of a beat signal having a frequency of a difference between a frequency of one of the radar signals and a frequency of a corresponding one of the reflected waves and a second frequency spectrum obtained by performing Fourier transform in a relative velocity direction on the first frequency spectrum,
calculating, by the processing circuitry for each of the radars, distance and velocity information indicating a distance to the observation target and a relative velocity with respect to the observation target on a basis of a beat frequency and a Doppler frequency corresponding to a peak value in the second frequency spectrum; and
comparing, by the processing circuitry, the distance and velocity information calculated for each of the radars,
determining, by the processing circuitry, when the distance and velocity included in the distance and velocity information for the radars match between the radars, that the distance and velocity included in the distance and velocity information are the distance to the observation target and the velocity with respect to the observation target, and when the distance and velocity included in the distance and velocity information do not match between the radars due to their differences corresponding to differences in frequency gradients of radar signals, and that the distance and velocity included in the distance and velocity information result from erroneous detection due to electromagnetic noise.

* * * * *

UNITED STATES PATENT AND TRADEMARK OFFICE
CERTIFICATE OF CORRECTION

PATENT NO. : 12,276,720 B2
APPLICATION NO. : 17/840992
DATED : April 15, 2025
INVENTOR(S) : Yusuke Kitsukawa et al.

Page 1 of 1

It is certified that error appears in the above-identified patent and that said Letters Patent is hereby corrected as shown below:

In the Claims

At Column 24, Line 52:
Please change "," to --;--

At Column 24, Line 54:
Please change "," to --;--

At Column 24, Line 63:
Please change "," to --;--

At Column 25, Line 2:
Please change ", and" to --;--

At Column 25, Line 4:
Please change "," to --; and--

Signed and Sealed this
Fifteenth Day of July, 2025

Coke Morgan Stewart
*Acting Director of the United States Patent and Trademark Office*